United States Patent [19]

Tsutsui

[11] Patent Number: 5,619,570
[45] Date of Patent: Apr. 8, 1997

[54] INFORMATION FURNISHING AND COLLECTION SYSTEM

[75] Inventor: Kyoya Tsutsui, Kanagawa, Japan

[73] Assignee: Sony Corporation, Japan

[21] Appl. No.: 131,943

[22] Filed: Oct. 8, 1993

[30] Foreign Application Priority Data

Oct. 16, 1992 [JP] Japan ...................... 4-304706

[51] Int. Cl.$^6$ ............................... H04L 9/00; H04L 9/32
[52] U.S. Cl. ................... 380/4; 380/3; 380/23; 380/25; 380/49; 380/50; 235/380; 340/825.31; 340/825.34
[58] Field of Search ................. 380/3, 4, 23, 24, 380/25, 49, 50; 235/379, 380; 340/825.31, 825.34; 369/7

[56] References Cited

U.S. PATENT DOCUMENTS

| | | | |
|---|---|---|---|
| 3,560,666 | 2/1971 | Bookman | 369/7 |
| 4,408,309 | 10/1983 | Kiesling et al. | 369/7 |
| 4,529,870 | 7/1985 | Chaum | 235/380 |
| 4,536,647 | 8/1985 | Atalla et al. | 235/379 |
| 4,906,828 | 3/1990 | Halpern | 235/379 |
| 4,907,268 | 3/1990 | Bosen et al. | 380/4 |
| 4,965,680 | 10/1990 | Endoh | 380/4 X |
| 4,977,595 | 12/1990 | Ohta et al. | 380/24 |
| 5,093,862 | 3/1992 | Scwartz | 380/25 |
| 5,109,413 | 4/1992 | Comerford et al. | 380/4 |
| 5,199,066 | 3/1993 | Logan | 380/4 |

FOREIGN PATENT DOCUMENTS

| | | | |
|---|---|---|---|
| 60-65388 | 4/1985 | Japan | G06K 17/00 |
| 3118690 | 5/1991 | Japan | G07F 17/00 |

OTHER PUBLICATIONS

H. Pender et al, *Electrical Engineers' Handbook*; vol. 5, 3rd Edition; 1936, John Wiley & Sons, New York; "Magnetic Recording and Reproducing", pp. 6–49 and 6–50.

J. Lenk, *Handbook of Microprocessors, Microcomputers, and Minicomputers*; 1979, Prentice–Hall; pp. 115–138.

*Primary Examiner*—Bernarr E. Gregory
*Attorney, Agent, or Firm*—Ronald P. Kananen

[57] ABSTRACT

An information furnishing and collection system which allows rapid furnishing of information and flexible payment of a charge and collects information regarding a reaction of a user while enhancing the security of information management is disclosed. Inputting to an information recording and reproduction apparatus and recording onto and reproduction from an information recording medium are performed under the control of a write management section. When inputting to an information inputting section or recording onto the information recording medium is to be controlled, the write management section controls the information inputting function or the information recording function using a control signal. An information signal is sent as information to the information recording medium by way of the information inputting section. When reproduction from the information recording medium is to be controlled, the write management section reads out, from among information recorded on the information recording medium, information of a type of the information itself or a reproduction condition. The information thus read out is sent as display information to and displayed on a display section.

37 Claims, 22 Drawing Sheets

F I G. 1
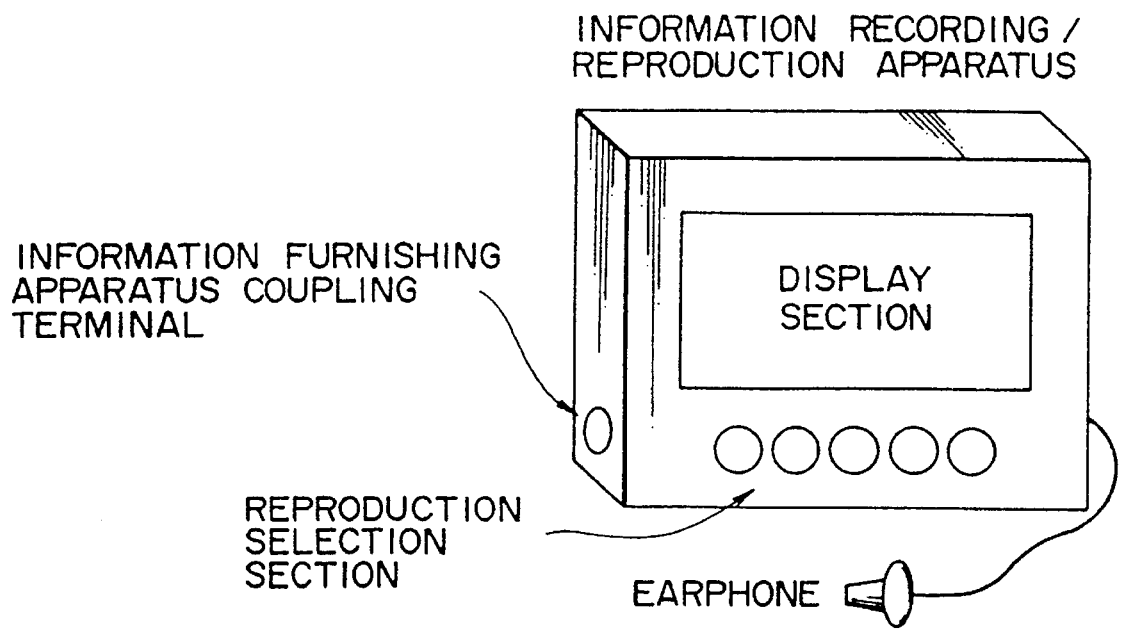
F I G. 2
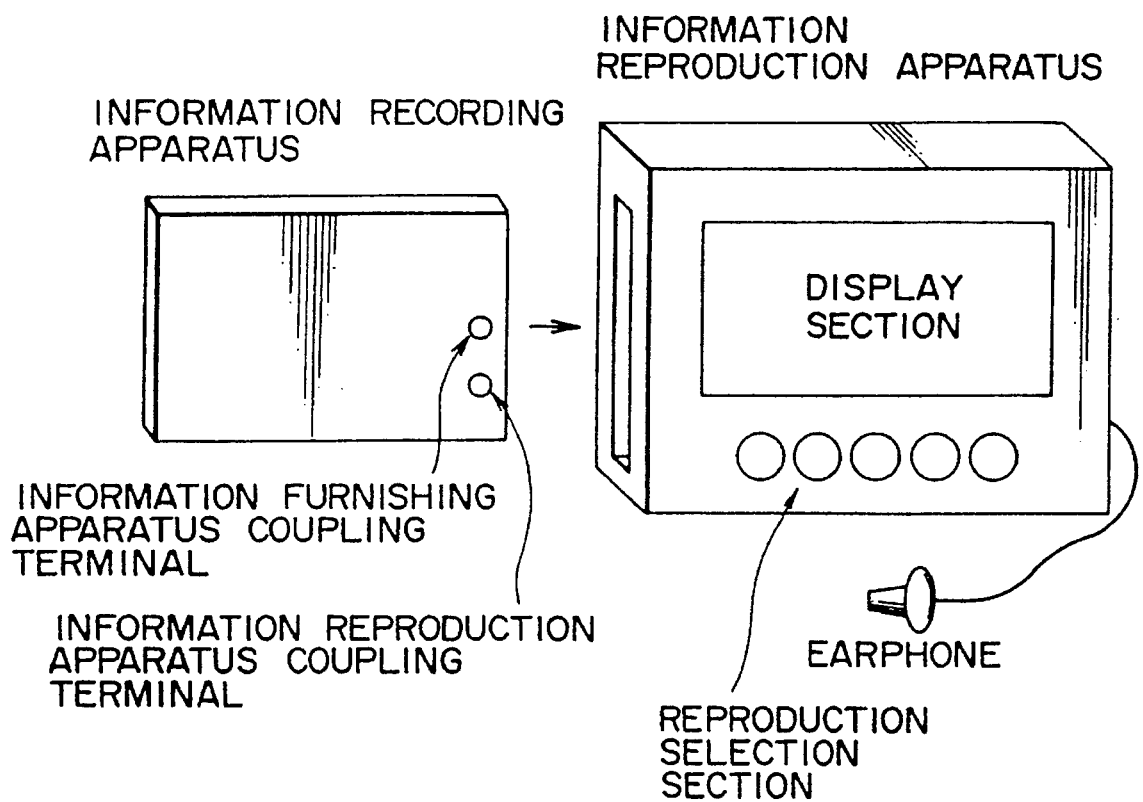

FIG. 9
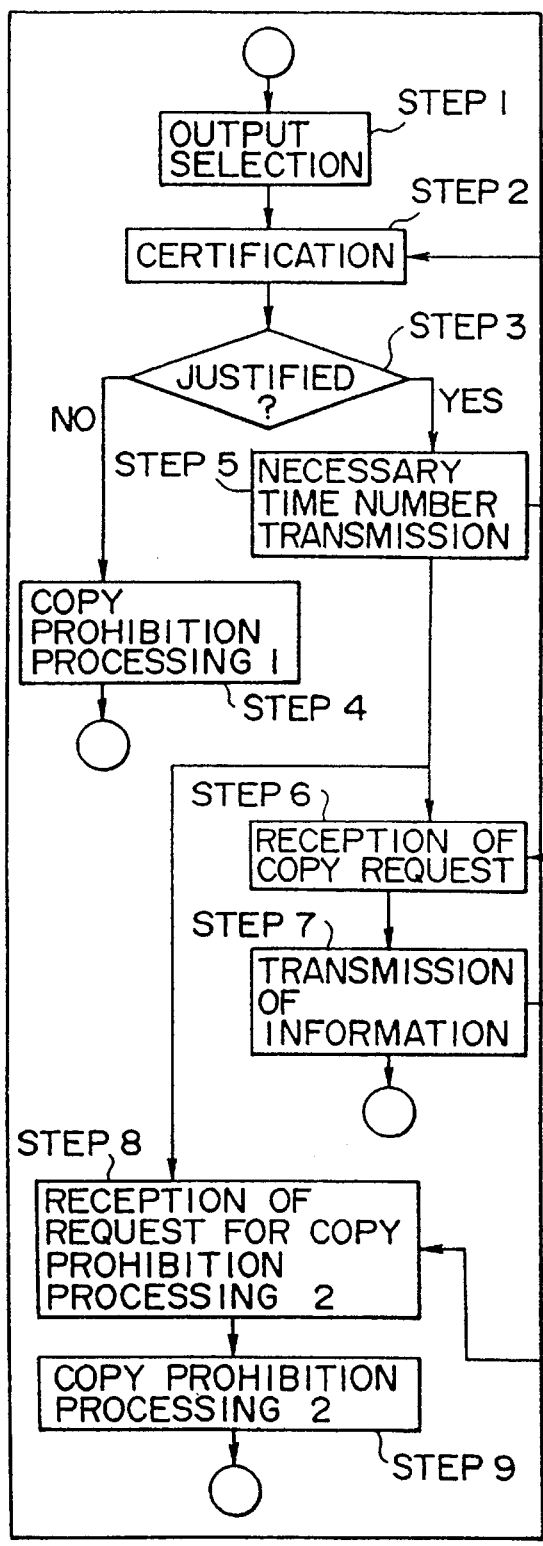
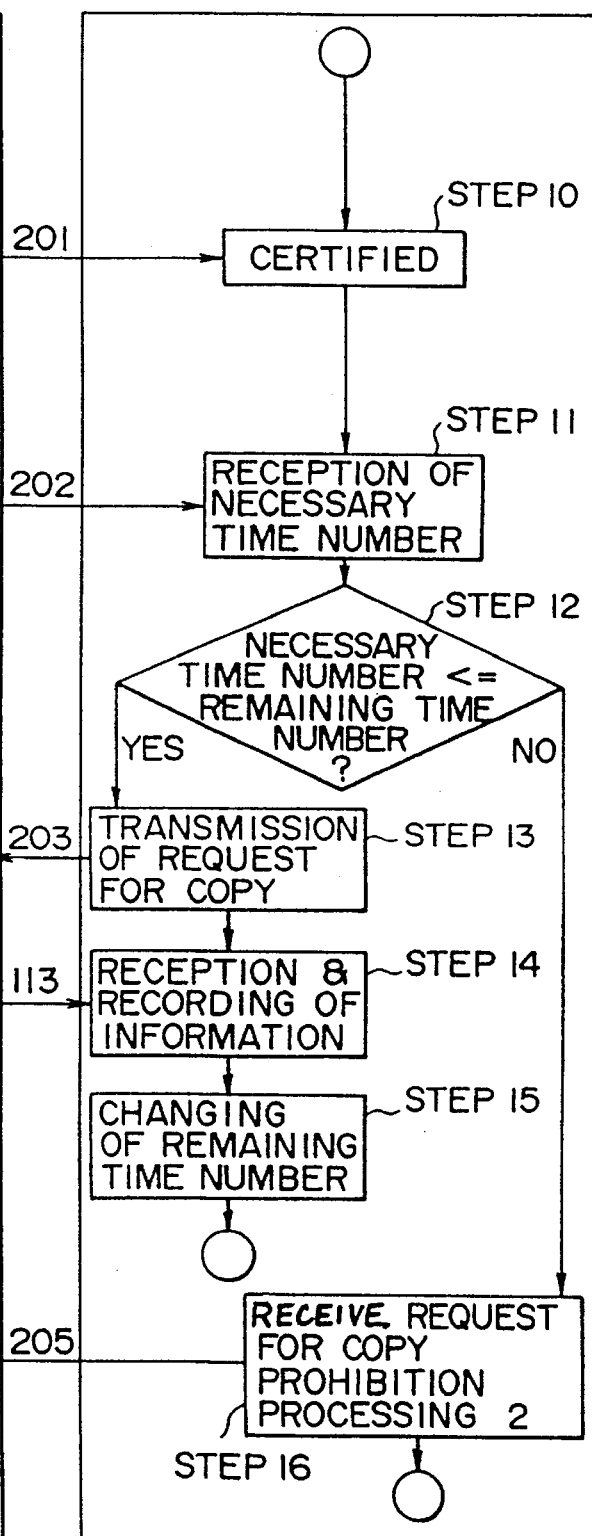

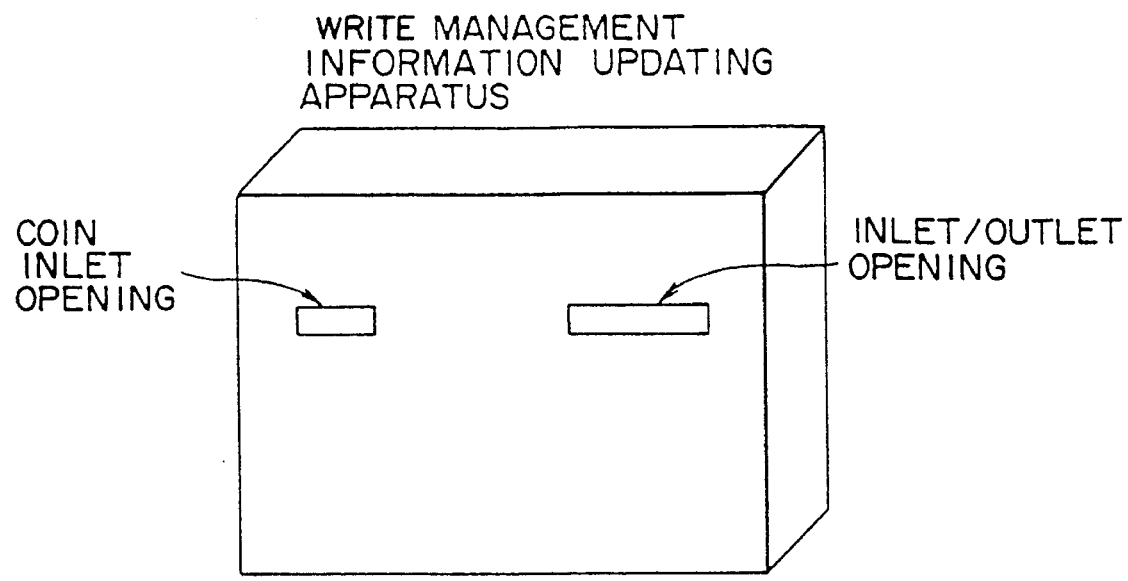
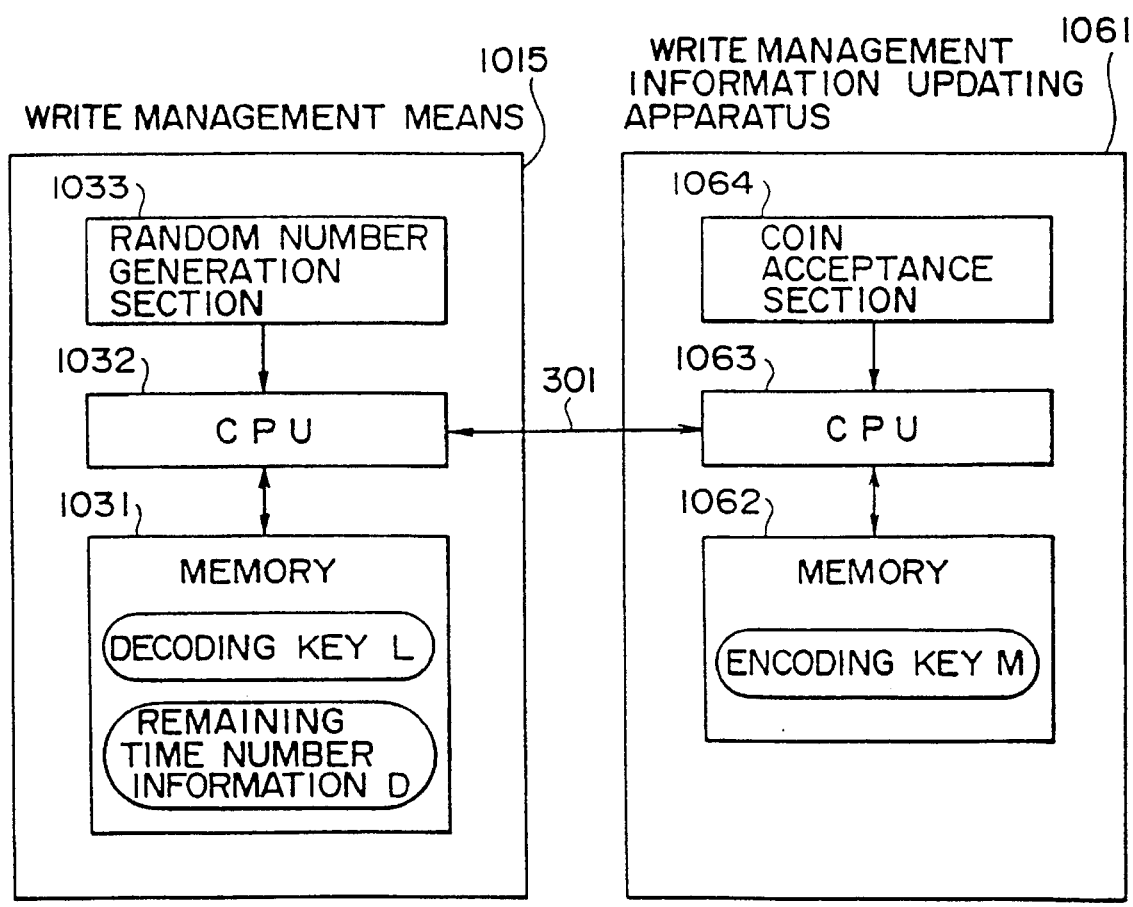

FIG. 15
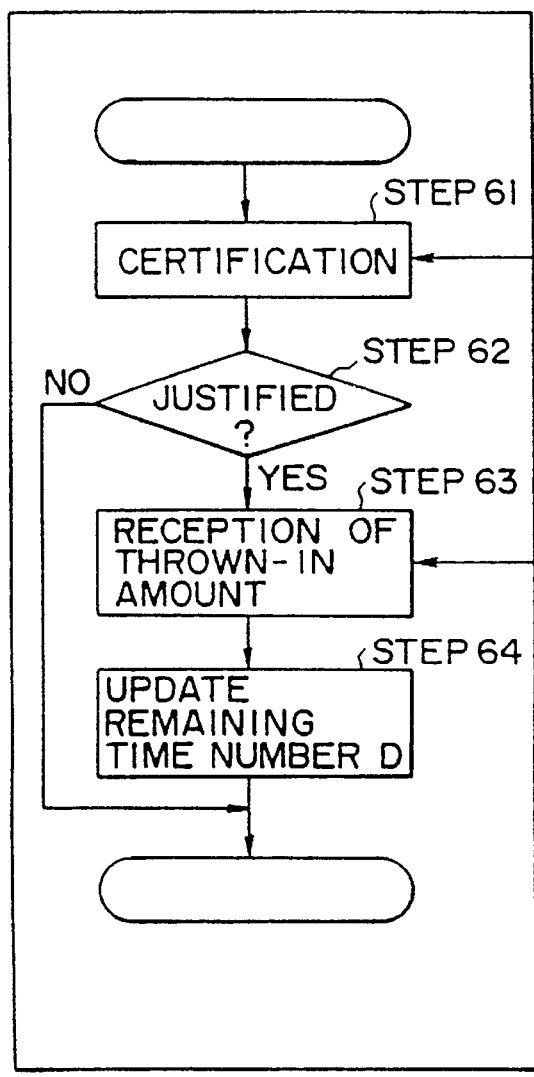
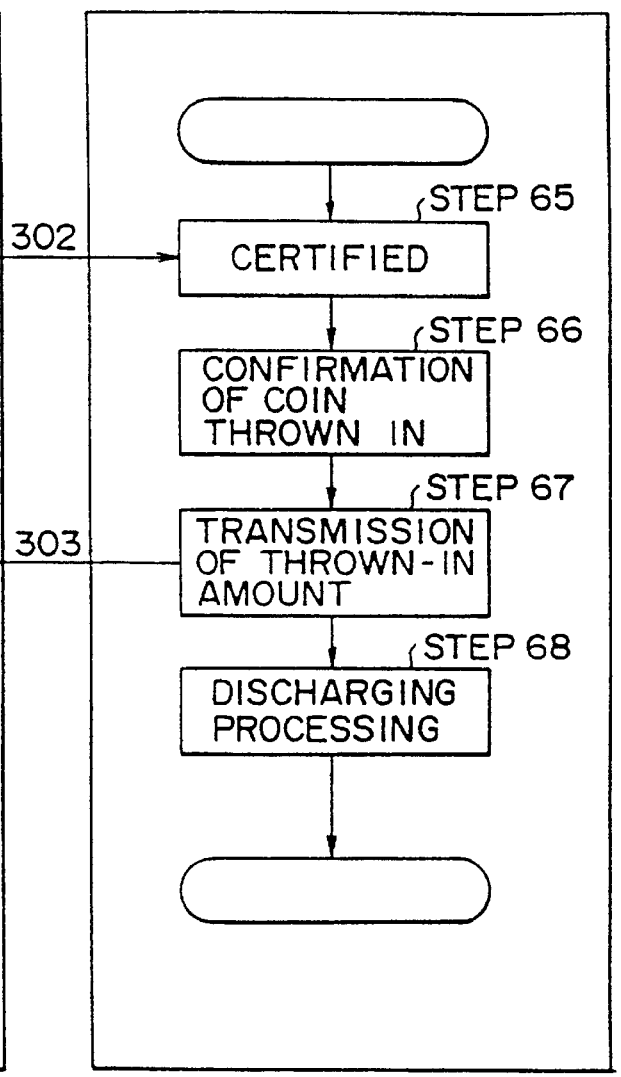

FIG. 16
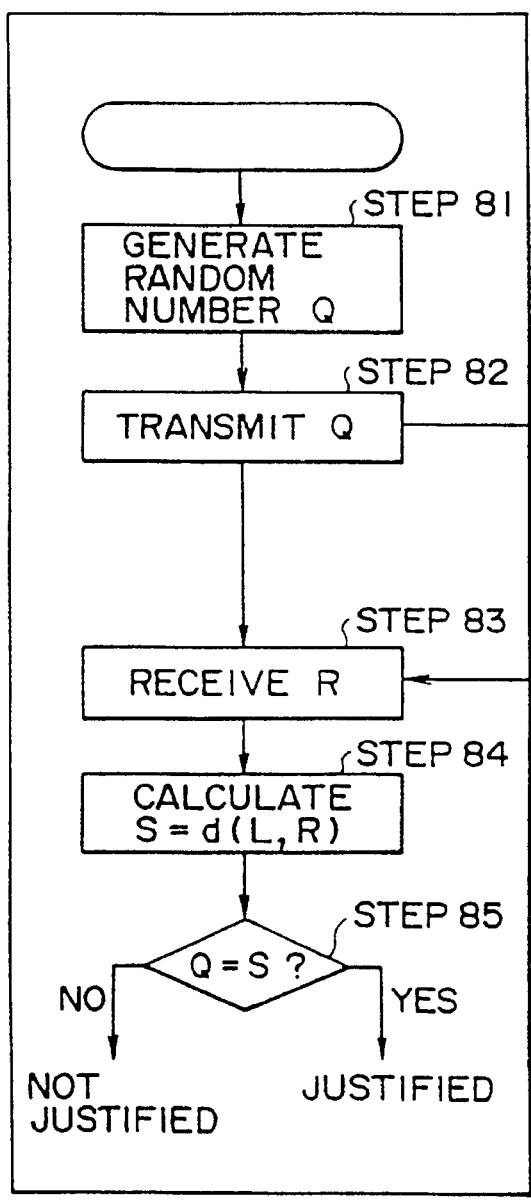
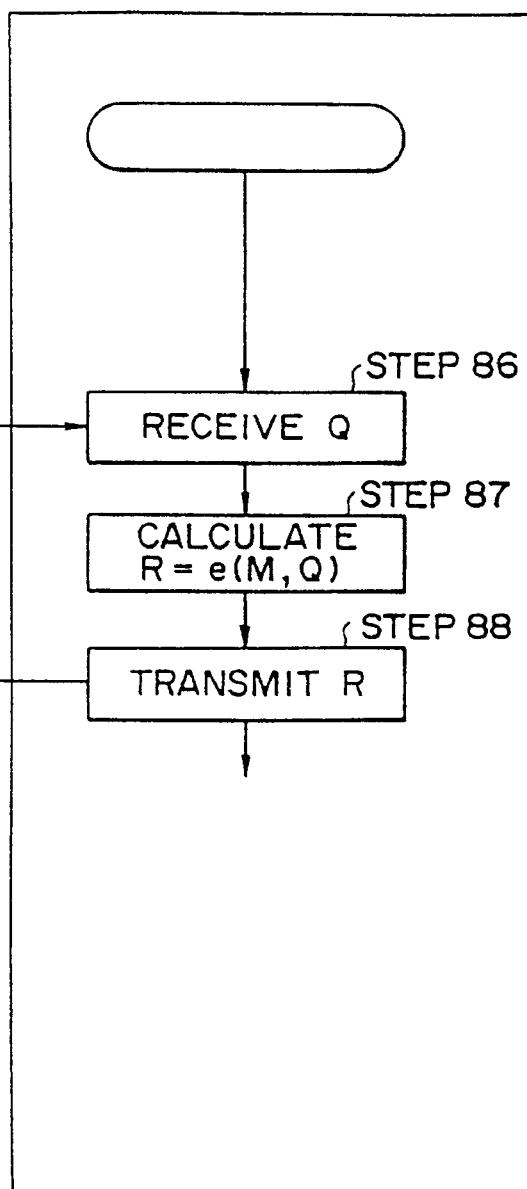

F I G. 23
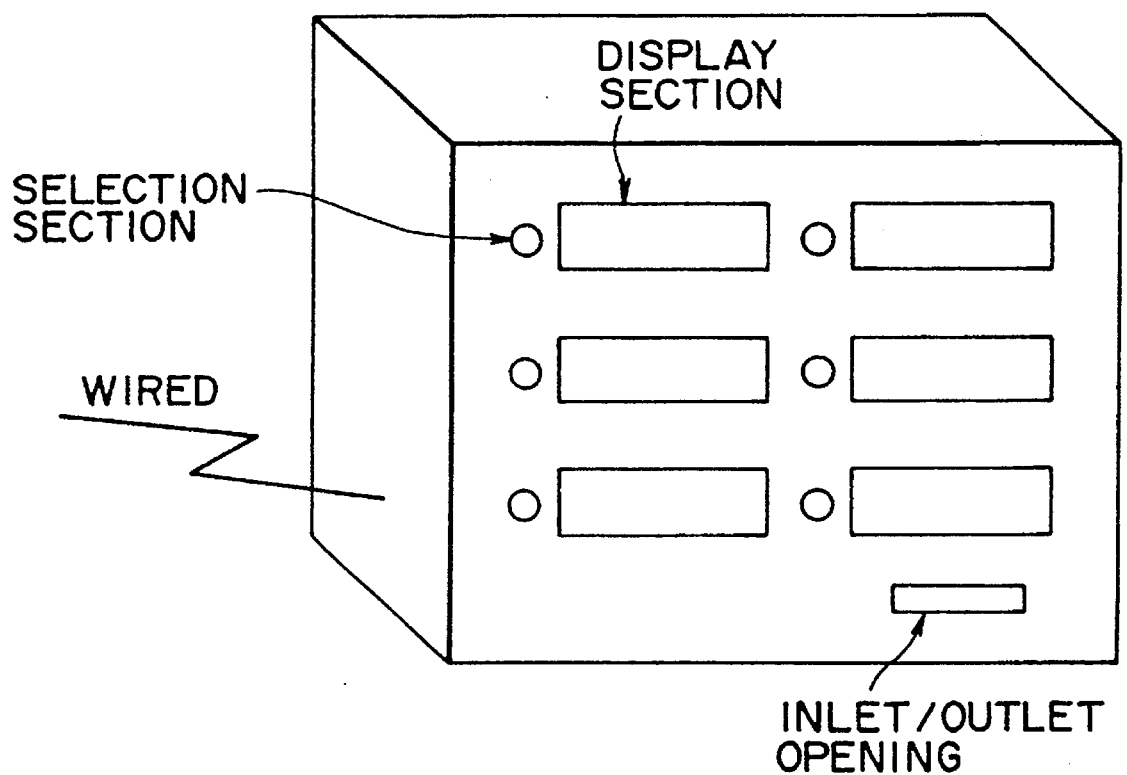

INFORMATION FURNISHING AND COLLECTION SYSTEM

BACKGROUND OF THE INVENTION

1. Field of the Invention

This invention relates to an information recording apparatus which acquires and furnishes information such as news or music rapidly and includes means for detecting a reaction of a user.

2. Description of the Related Art

Information recording apparatus are already known which include information inputting means connected to a controller which sends out information by wireless or wired transmission, recording means for recording information inputted by way of the inputting means onto an information recording medium, means defining an outlet opening for discharging the information recording medium therethrough, and account settlement means. An exemplary one of information recording apparatus of the type just described is disclosed, for example, in Japanese Patent Laid-Open Application No. Heisei 3-118690.

If the information recording apparatus is used, by setting, for example, a cassette tape available in position into the information recording apparatus and performing account settlement processing such as use time number management using coins or a card, information such as news or music can be copied by the information recording apparatus to and furnished as the cassette tape. The publication mentioned above further discloses the following process. In particular, a user will first insert a recording medium in the form of a cassette tape or the like into an inlet opening of the information recording apparatus and then insert a coin into the information recording apparatus and select a type of information on the information recording apparatus. Then, the information recording apparatus copies information onto the information recording medium in accordance with the selected type of information and then discharges the recording medium from the inlet opening which serves also as an outlet opening.

Meanwhile, as a medium for supplying music such as a popular musical piece or a quiz, broadcasting such as radio broadcasting or television broadcasting is utilized in most cases.

The process described above has no trouble when the copying rate is low such as when the information recording medium is a cassette tape. However, if it is tried to copy information onto a recording medium which employs, for example, a semiconductor memory, then furnishing of information to the recording medium can be completed at a moment. In this instance, however, if it is involved to effect settlement of accounts using a coin, a card or like means every time although such copying to the recording medium is completed at a moment, then a cumbersome operation such as insertion of a coin is required for a person who wants to obtain the information, and also much time is required. Therefore, with the conventional information recording apparatus, if many people try to obtain information, for example, at a station, the number of people who can obtain desired information in a limited period of time such as upon waiting of an electric car is limited.

Further, with the conventional information recording apparatus, the operation of the information recording apparatus for accepting and discharging a recording medium makes a bottleneck together with an information selection operation or a coin throwing in operation of each utilizer such that the utilizer occupies the information recording apparatus until after such operations of the information recording apparatus are completed. Therefore, the conventional information recording apparatus fails to supply information to many utilizers rapidly.

Further, in the conventional information recording apparatus, settlement of accounts is performed upon recording onto an information recording medium. However, it sometimes occurs that the person who has obtained information is interested in only a little part of the thus recorded information and only the part is reproduced actually. Even in this instance, since settlement of accounts has been completed upon recording of information, such a disadvantage sometimes occurs that the person who has obtained information must pay the charge for all of the information thus obtained.

Meanwhile, a broadcasting station conventionally broadcasts its programs only one-sidedly. Accordingly, with the conventional information recording apparatus, it is difficult to grasp the actual condition how the audience actually enjoys the programs or information of what musical piece is popular. Further, also in a program of, for example, a quiz, it is difficult, with the conventional information recording apparatus, to grasp a ratio of correct answers of the audience or to permit the audience to make a competition in ratio of correct answers among them.

On the other hand, also methods have conventionally been proposed wherein such information is grasped using a cable television system (CATV) having bidirectional functions. However, those methods are disadvantageous in that, since an apparatus for enjoying a program is fixedly installed indoors, it cannot be applied in order to detect a situation of the audience outdoors.

Further, generally a justified write management information updating apparatus can be managed severely. However, since an information recording (reproduction) apparatus is used by a large number of people, it is difficult to effect severe management of the apparatus. Besides, whichever one of a plurality of write management information updating apparatus is not justified, this makes a trouble in that the remaining time numbers in the other information recording (reproduction) apparatus are updated.

SUMMARY OF THE INVENTION

It is an object of the present invention to provide an information furnishing and collection system which allows rapid acquisition of information and flexible settlement of accounts of the charge.

It is another object of the present invention to provide an information furnishing and collection system which can collect information regarding reactions of the audience.

It is a further object of the present invention to provide an information furnishing and collection system which is high in security in information management.

In order to attain the objects described above, according to an aspect of the present invention, there is provided an information furnishing and collection system, which comprises an information recording apparatus including an information recording medium and write management means for controlling recording or reproduction of information under the control of the write management means.

In the information furnishing and collection system, recording or reproduction of information is controlled by the write management means. Consequently, flexible payment of the charge can be achieved.

The write management means may effect its control in response to write management information recorded on the information recording medium. Thus, the write management means effects its control in response to write management information such as remaining time number information recorded on the information recording medium. Consequently, flexible payment of the charge can be achieved.

In this instance, contents of the write management information may be varied upon recording or reproduction. Consequently, contents of the write management information such as remaining time number information are different before and after the time of recording or reproduction. As a result, flexible payment of the charge can be achieved.

The write management information may be an effective period within which recording or reproduction is allowed. Thus, the write management information such as remaining time number information is the effective period within which recording or reproduction is allowed. Consequently, flexible payment of the charge can be achieved.

Preferably, part of information recorded on the recording medium represents contents of the information itself. This allows flexible payment of the charge.

Preferably, the recording medium is a semiconductor memory. Consequently, information can be acquired rapidly.

Preferably, the recording medium and the write management means of the information recording apparatus are mounted on a common card. Consequently, information can be acquired rapidly.

The recording medium may have non-re-writable information recorded thereon and effect write management upon reproduction. This allows flexible payment of the charge.

Alternatively, the recording medium may receive re-writable information from an information furnishing apparatus and record the received re-writable information thereon. This allows flexible payment of the charge.

In this instance, preferably recording of information onto the recording medium is performed when certification by the information furnishing apparatus is proved. This enhances the security of information management.

Further preferably, the certification is performed based on key information recorded in the information furnishing apparatus and the information recording apparatus and having a value encoded by itself. This further enhances the security of information management.

Reproduction of information may be performed in response to a reproduction selection signal. This allows flexible payment of the charge.

Alternatively, reproduction of information may be performed in response to a reproduction selection signal received from the outside. This allows flexible payment of the charge.

In this instance, preferably reproduction of information is performed when certification of the information recording apparatus is proved by an information furnishing apparatus. This enhances the security of information management.

Further preferably, the certification is performed based on encoded key information recorded in the information recording apparatus and the information furnishing apparatus. This further enhances the security of information management.

The write management information may be re-writable by a write management information updating apparatus. This allows flexible payment of the charge.

In this instance, preferably re-writing of the write management information is performed when certification of the write management information updating apparatus is proved by the information recording apparatus. This enhances the security of information management.

Further preferably, the certification of the write management information updating apparatus is proved by the information recording apparatus. This further enhances the security of information management.

Preferably, the key information recorded in the write management information updating apparatus and the key information recorded in the information recording apparatus have different values from each other. This further enhances the security of information management.

According to another aspect of the present invention, there is provided an information furnishing and collection system, which comprises an information furnishing apparatus having an inlet portion and an outlet portion formed separately from each other therein for inserting and discharging an information recording apparatus, the information furnishing apparatus being provided to record information into the information recording apparatus. The information furnishing and collection system allows rapid acquisition of information.

The information furnishing apparatus may include a recording medium located in the inside thereof and transfer information recorded on the recording medium to the information recording apparatus. This allows rapid acquisition of information.

Preferably, the recording medium is a semiconductor memory. This allows rapid acquisition of information.

The transfer of information from the recording medium to the information recording apparatus may be performed by way of a terminal. This allows rapid acquisition of information.

Preferably, the transfer of information from the recording medium to the information recording apparatus is performed by way of non-contacting means. This allows rapid acquisition of information.

The information recording apparatus may receive information transferred thereto from the information furnishing apparatus and reproduce the information under the control of write management means thereof. This allows flexible payment of the charge.

According to a further aspect of the present invention, there is provided an information furnishing and collection system, which comprises a first information recording medium for recording information to be reproduced and utilized, a second information recording medium for recording information inputted by a user of the information furnishing and collection system, and transmission means for transmitting information recorded on the second information recording medium to the outside.

In the information furnishing and collection system, information to be reproduced and utilized is recorded onto the first information recording medium while information inputted by a user of the information furnishing and collection system is recorded onto the second information recording medium. The information recorded on the second information recording medium is transmitted to the outside by the transmission means. Consequently, flexible payment of the charge can be achieved.

Preferably, the first information recording means allows writing of information onto the same from the outside. This allows flexible payment of the charge.

The information inputted by a user of the information furnishing and collection system may be selection information which is urged to be inputted by reproduction of the information recorded on the first information recording medium. Consequently, information regarding reactions of the users can be obtained.

Preferably, the information inputted by a user of the information furnishing and collection system is information regarding a reproduction utilization condition of the information. Consequently, information regarding reactions of the users can be obtained.

Preferably, the first information recording medium is an integrated circuit memory. This allows rapid acquisition of information.

Preferably, the second information recording medium is an integrated circuit memory. This also allows rapid acquisition of information.

The information furnishing and collection system may further comprise an information recording apparatus having components mounted on a card. This allows rapid acquisition of information.

The information furnishing and collection system may further comprise means for reading out information recorded on the second information recording medium. Consequently, information regarding reactions of the users can be obtained.

The information furnishing and collection system may further comprise a medium for recording information based on information read out from the second information recording medium. Consequently, information regarding reactions of the users can be obtained.

Preferably, the information furnishing and collection system further comprises means for writing information onto the first information recording medium. This allows rapid payment of the charge.

Preferably, the information furnishing and collection system further comprises wired or wireless transmission means which transmits information based on information read out from the second information recording medium after it is processed after it is stored once onto a recording medium or without storing it or without processing it. This allows flexible payment of the charge.

An information furnishing condition or an information utilization condition may be varied relying upon a type or contents of information read out from the second information recording medium. This allows flexible payment of the charge.

The information furnishing and collection system may collect, from a plurality of information recording apparatus, information based on information read out from the second information recording medium by the transmission means. This allows information regarding reactions of the users to be obtained.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a schematic perspective view showing the appearance of an information recording/reproduction apparatus in an information furnishing and collection system to which the present invention is applied;

FIG. 2 is a schematic perspective view showing a modification to the information recording/reproduction apparatus of FIG. 1 wherein an information recording apparatus and an information reproduction apparatus are formed physically separately from each other;

FIG. 9 is a flow chart illustrating operation of the information furnishing and collection system when settlement of accounts is performed upon recording of the information recording/reproduction apparatus;

FIG. 13 is a schematic perspective view showing the appearance of a write management information updating apparatus of the information furnishing and collection system of the present invention;

FIG. 14 is a block diagram showing the construction of the write management section and the management information updating apparatus shown in FIG. 13;

FIG. 15 is a flow chart illustrating processing of the write management section and the write management information updating apparatus shown in FIG. 14;

FIG. 16 is a flow chart illustrating processing of certification of the write management section and the write management information updating apparatus shown in FIG. 14;

FIG. 23 is a schematic perspective view showing the appearance of an information furnishing apparatus for use with the information recording/reproduction apparatus of FIG. 20 or 21;

DETAILED DESCRIPTION OF THE PREFERRED EMBODIMENT

Figure 3:
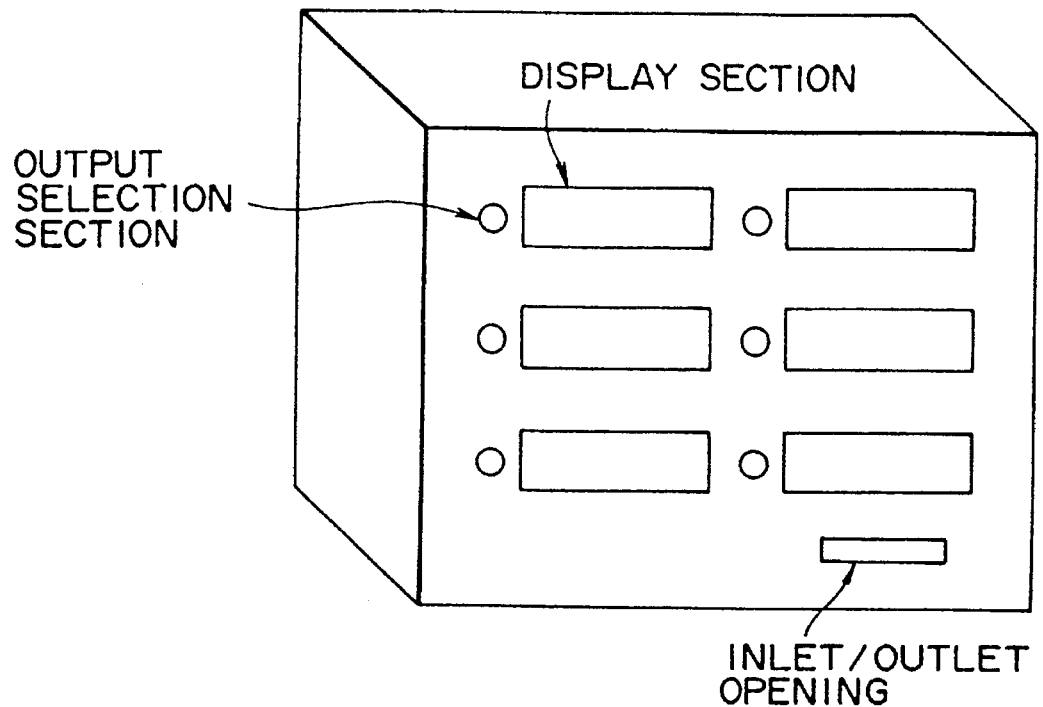
FIG. 3 is a schematic perspective view showing the appearance of an information furnishing apparatus of the information furnishing and collection system to which the present invention is applied.

Referring first to FIG. 1, there is shown an information recording and reproduction apparatus (information recording/reproduction apparatus) of an information furnishing and collection system to which the present invention is applied. The information recording and reproduction apparatus shown has an information furnishing apparatus coupling terminal provided at a side portion thereof. Information is supplied from an information furnishing apparatus not shown in FIG. 1 to the information recording and reproduction apparatus by way of the information furnishing apparatus coupling terminal and copied onto a recording medium (not shown in FIG. 1) located in the information recording and reproduction apparatus. Further, a display section serving as display means and a plurality of reproduction selection buttons serving as reproduction selection means are located on a front face of the information recording and reproduction apparatus.

In operation, the display section can display thereon contents of information recorded in the information recording and reproduction apparatus. The user of the information furnishing and collection system can selectively reproduce, based on the information displayed on the display section, necessary information using the reproduction selection means such as buttons. The contents of the information may include text information, audio information, video information, computer programs and so forth and are not limited to specific information. Here, reproduction of a program signifies execution of the program, and in this instance, the user my input, upon execution of such program, information when necessary. When the reproduction signal is a text or a video signal, the reproduction signal is displayed on the display section which may be formed from a liquid crystal apparatus, but when the reproduction signal is audio information, it is outputted to an earphone. Though not shown in FIG. 1, a loudspeaker may naturally be provided in place of the earphone, or both of them may be provided. In the last case, a result of reproduction of audio information may be outputted to the loudspeaker.

Though not shown in FIG. 1 either, the reproduction signal may be connected to an external CRT (cathode ray tube) or an external loudspeaker by way of an external terminal provided on the information recording and reproduction apparatus. Further, there is no limitation in type of the recording medium. Generally, however, it is convenient to use an IC (integrated circuit) which allows copying at a high speed and is easy in random accessing and superior in portability.

FIG. 2 shows the appearance of a modification to the information recording and reproduction apparatus shown in FIG. 1. Referring to FIG. 2, the present information recording and reproduction apparatus is modified in that an information recording apparatus and an information reproduction apparatus physically separated from each other constitute the information recording and reproduction apparatus shown in FIG. 1. The information recording apparatus is mounted on a card. However, since communication of data and control signals is required between the information recording apparatus and the information reproduction section upon reproduction, an information furnishing apparatus coupling terminal and an information reproduction apparatus coupling terminal for coupling them to each other are provided on each of the information recording apparatus and the information reproduction apparatus. The information recording apparatus coupling terminal and the information reproduction apparatus coupling terminal of the information recording apparatus may otherwise be formed from a single common terminal which is changed over suitably when it is used. Operation of the present information recording and reproduction apparatus is similar to that of the information recording and reproduction apparatus of FIG. 1.

FIG. 3 shows the appearance of an information furnishing apparatus of the information furnishing and collection system to which the present invention is applied. A recording medium is installed in the information furnishing apparatus and has information recorded thereon. Though not shown in FIG. 3, information to be recorded is conveniently transmitted by wireless or wired information transmission means. However, a recording medium having information already recorded thereon may naturally be inserted directly in position into the information furnishing apparatus.

The information furnishing apparatus shown in FIG. 3 has a plurality of display sections provided on a front face thereof and serving as display means for displaying contents of information recorded on the recording medium, a charge and so forth. The information furnishing apparatus further has a plurality of output selection buttons provided on the front face thereof and serving as output selection means for selecting information to be outputted from the information furnishing apparatus. A person who wants to acquire information can thus select desired information by operation of the output selection buttons. The information furnishing apparatus has an inlet/outlet opening formed on the front face thereof for inserting an information recording and reproduction apparatus or an information recording apparatus. In order to acquire information, an information recording and reproduction apparatus or an information recording apparatus is inserted into the inlet/outlet opening of the information furnishing apparatus, and desired information is copied into the information recording and reproduction apparatus or the information recording apparatus.

Figure 4:
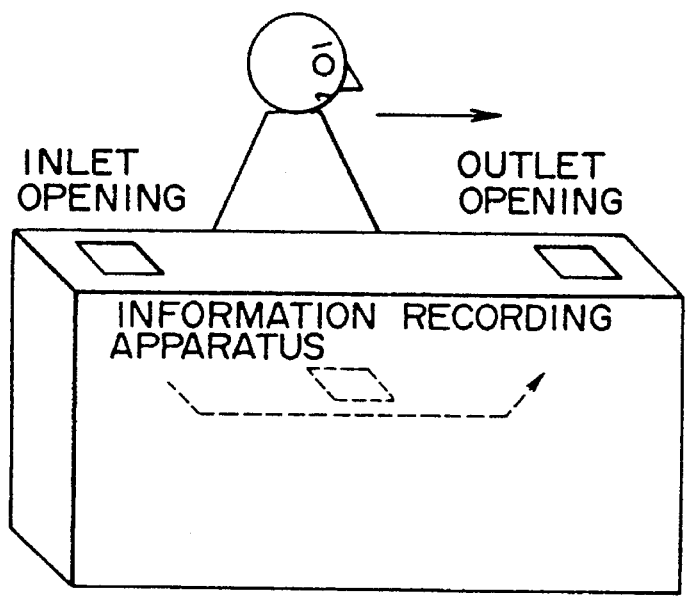
FIG. 4 is a schematic perspective view showing the appearance of another form of information furnishing apparatus of the information furnishing and collection system of the present invention.

FIG. 4 shows the appearance of another form of information furnishing apparatus of the information furnishing and collection system to which the present invention is applied. Referring to FIG. 4, in the information furnishing apparatus shown, an inlet opening and an outlet opening are formed separately at a distance. Further, a belt for transporting an information recording apparatus is provided in the information furnishing apparatus. In operation, if an information recording apparatus is inserted into the inlet opening, it is then transported by the belt and discharged from the outlet opening. Thus, a person who wants to acquire information can acquire desired information while walking. In this manner, the information furnishing apparatus is convenient where information is furnished rapidly to a large number of people.

Figure 5:
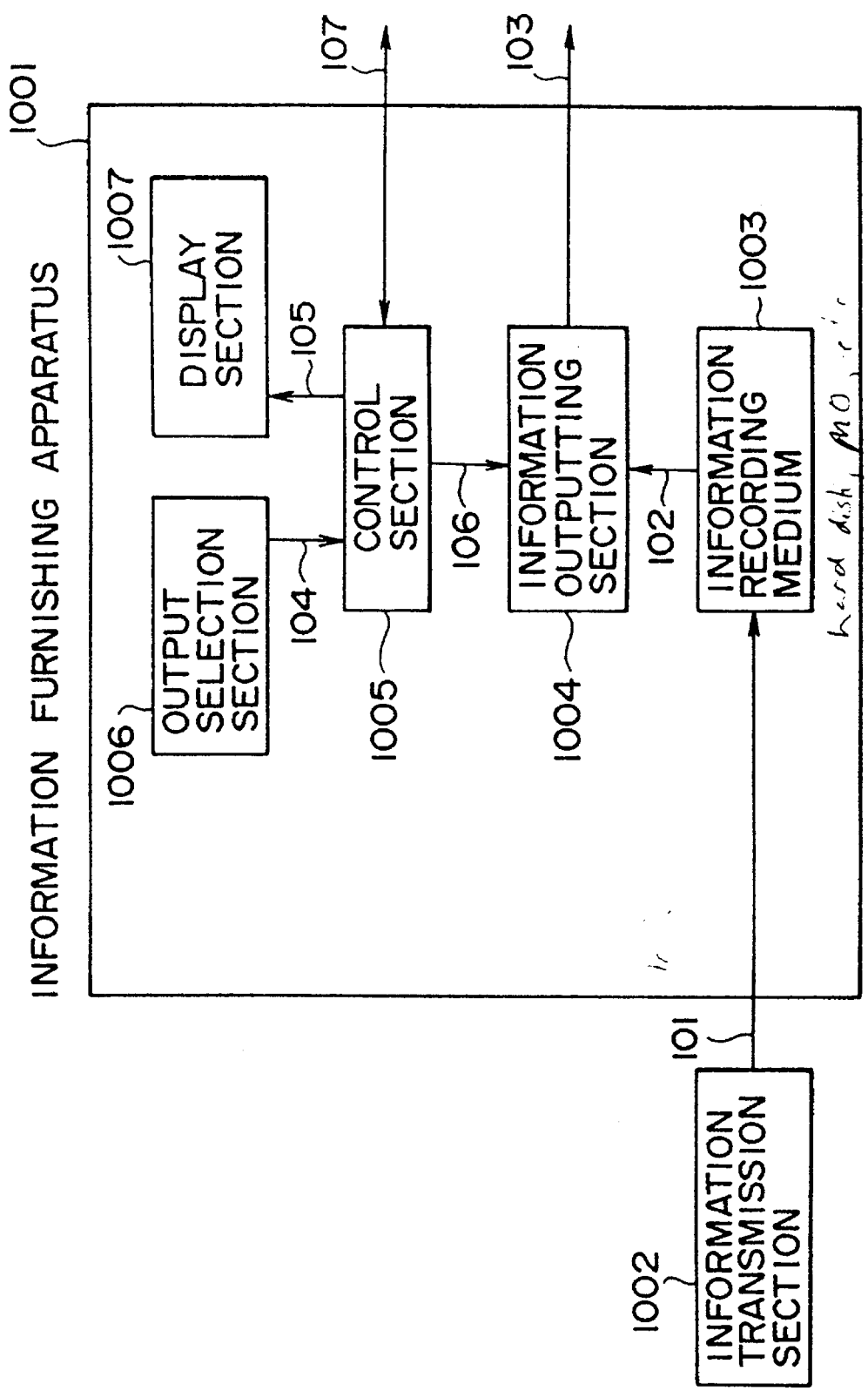
FIG. 5 is a block diagram Showing the construction of the information furnishing apparatus shown in FIG. 3.

FIG. 5 shows, in block diagram, an information furnishing apparatus of the information furnishing and collection system to which the present invention is applied. Referring to FIG. 5, an information recording medium 1003 may be a hard disk, a magneto-optical disk or any other information recording medium. Generally, however, the efficiency is high where the information recording medium 1003 allows random accessing and allows reading out at a rate substantially equal to the recording rate of the information recording and reproduction apparatus. To this end, the recording medium 1003 is conveniently constructed from an IC memory. The information recording medium 1003 is connected to an information outputting section 1004, which is in turn connected to a control section 1005. The control section 1005 is connected to an output selection section 1006 and a display section 1007. The information furnishing apparatus 1001 is constituted from the components listed above. Meanwhile, the information recording medium 1003 is connected also to an information transmission section 1002.

In operation, information 101 is transmitted by the information transmission section 1002 in the form of a wired or wireless information transmission apparatus, and is recorded onto the information recording medium 1003. Information read out from the information recording medium 1003 is outputted as a signal 103 by way of the information outputting section 1004. The information outputting section 1004 outputs the information under the control of the control section 1005. The control section 1005 sends a signal 105 representative of contents of information, information furnishing terms, passage of the information furnishing processing process and so forth to the display section 1007. Then, the control section 1005 receives output selection information 104 inputted by way of the output selection section 100 by the person who wants to acquire information. Then, the control section 1005 performs communication 107 of contents hereinafter described with a write management section 1015 of an information recording and reproduction apparatus 1011 shown in FIG. 6. The information outputting section 1004 is controlled in response to a signal 106 produced in accordance with a result of the communication 107 by the control section 1005. Under the control in response to the signal 106, the information outputting section 1004 outputs the information 102 read out from the information recording medium 1003 as a signal 103 to the information recording and reproduction apparatus 1011.

Figure 6:
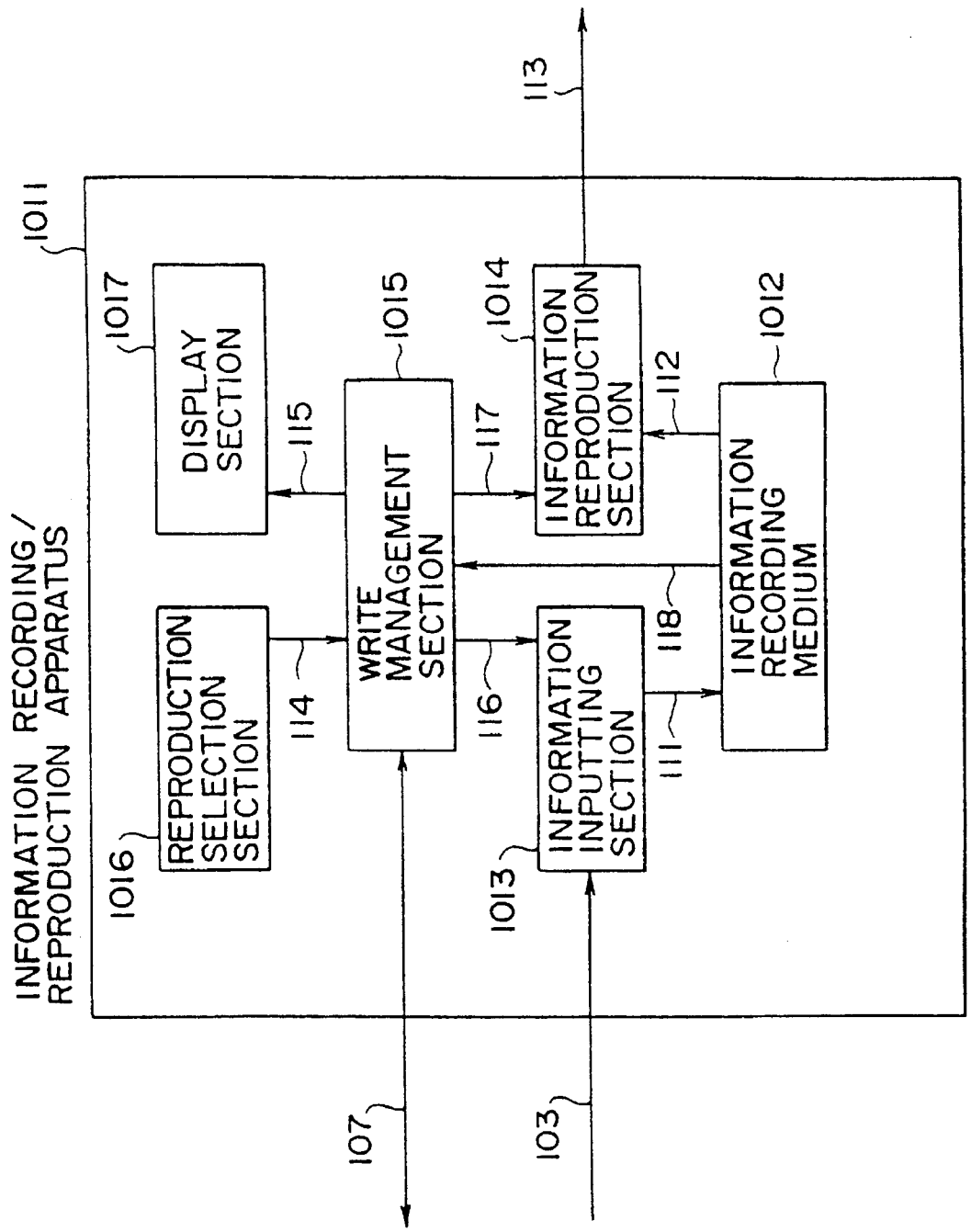
FIG. 6 is a block diagram showing the construction of the information recording/reproduction apparatus shown in FIG. 1.

FIG. 6 shows in block diagram the information recording and reproduction apparatus of the information furnishing reproduction apparatus to which the present invention is applied. Referring to FIG. 6, an information recording medium 1012 is connected to an information inputting section 1013, a write management section 1015 and an information reproduction section 1014. Further, the information reproduction section 1014 and the information inputting section 1013 are connected to the write management section 1015. A reproduction selection section 1016 and a display section 1017 are connected to the write management section 1015. The information recording and reproduction apparatus 1011 is constituted from the components listed above.

In operation, in the information recording and reproduction apparatus 1011, inputting to the information recording and reproduction apparatus 1011 and recording onto and reproduction from the information recording medium 1012 are performed under the control of the write management section 1015. When inputting to the information inputting section 1013 or recording onto the information recording medium 1012 is to be controlled, the write management section 1015 performs communication 107 of contents hereinafter described with the control section 1005 of the information furnishing apparatus 1001 shown in FIG. 5. The information inputting function or the information recording function of the information inputting section 1013 is controlled by a control signal 116 in accordance with a result of the communication 107. Then, a signal is sent as information 111 to the information recording medium 1012 by way of the information inputting section 1013.

On the other hand, when reproduction of the information recording medium 1012 is to be controlled, the write management section 1015 reads out, from within information recorded on the information recording medium 1012, information 118 of a type of the information itself, a reproduction condition and so forth. The information 118 is sent as display information 115 to and displayed on the display section 1017. In accordance with the display information 115, reproduction section information 114 as a reproduction selection signal inputted by way of the reproduction selection section 1016 by the user of the apparatus is sent to the write management section 1015. Then, the write management section 1015 performs such processing as hereinafter described to send a reproduction control signal 117 to the information reproduction section 1014. In response to the reproduction control signal 117, the information reproduction section 1014 reads out information 112 from the information recording medium 117 and outputs a reproduction signal 113 such as sound, an image or a text. It is to be noted that, where the reproduction signal 113 is a video signal or a text, for example, the video image or the text is reproduced on the display section 1017.

Figure 7:
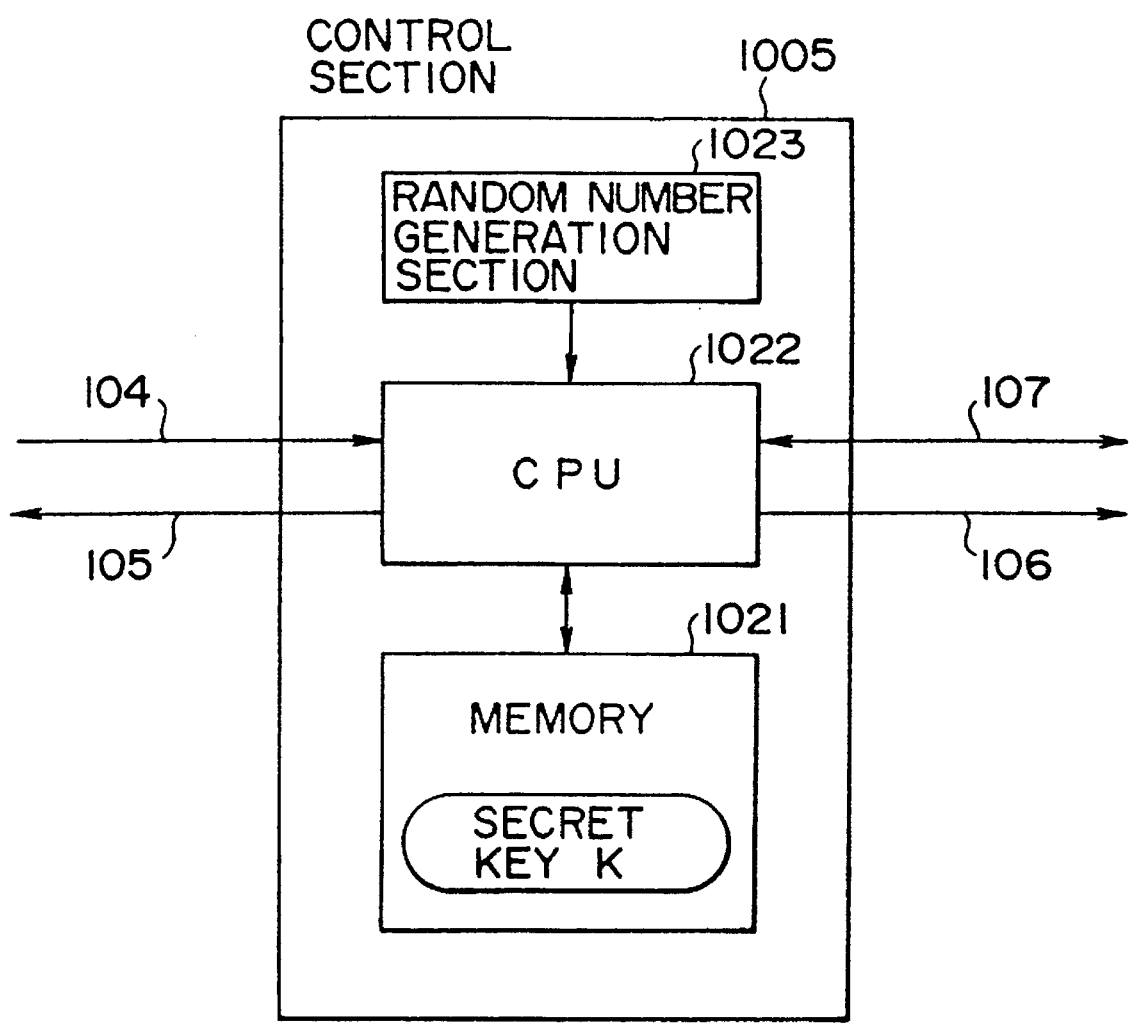
FIG. 7 is a block diagram showing the construction of a control section of the information furnishing apparatus of FIG. 5.

FIG. 7 shows the construction of the control section 1005 of the information furnishing apparatus 1001 shown in FIG. 5. Referring to FIG. 7, a memory 1021 is connected to a CPU (central processing unit) 1022, which is in turn connected to a random number generation section 1023. Thus, the control section 1005 is constituted from the memory 1021, CPU 1022 and random number generation section 1023. An encoded (enciphered) secret key K is recorded in the memory 1021. Operation of the control section 1005 will be hereinafter described in detail with reference to a flow chart.

Figure 8:
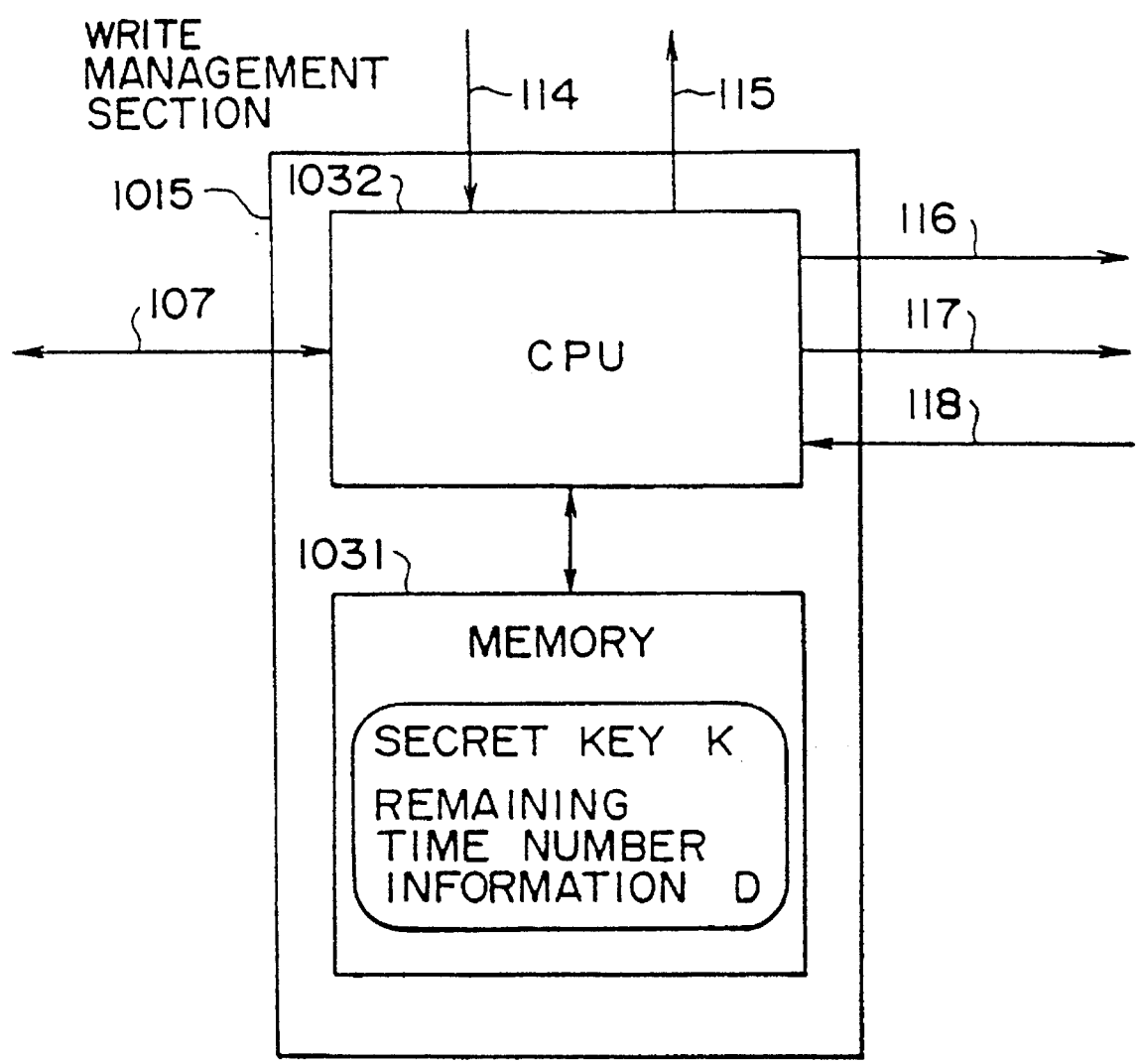
FIG. 8 is a block diagram showing the construction of a write management section of the information recording/reproduction apparatus of FIG. 6.

FIG. 8 shows the construction of the write management section 1015 of the information recording and reproduction apparatus 1011 shown in FIG. 6. Referring to FIG. 8, a memory 1031 is connected to a CPU 1032. The write management section 1015 is thus constituted from the memory 1031 and the CPU 1032. A secret key K as encoded (enciphered) key information and remaining time number information D as write management information are recorded in the memory 1031.

Here, the remaining time number information D represents write information how many times information can thereafter be acquired from the outside or how many times the information can thereafter be reproduced. However, the remaining time number information D may not directly represent the number of recording or reproduction times. For example, the remaining time number information D may represent the number of units of write necessary to record or reproduce information, and a different number of units may be decreased upon recording or reproduction depending upon contents of information. Further, the remaining time number is an example of write management information, and for example, an effective period within which recording or reproduction is available may be recorded in place of the remaining time number. Operation of the write management section 1015 will be hereinafter described in detail.

FIG. 9 illustrates in flow chart operation of the information furnishing and collection system of the present invention where settlement of accounts is performed upon recording into the information recording and reproduction apparatus. The communication 107 between the information furnishing apparatus 1001 and the information recording and reproduction apparatus 1011 and the transmission/reception signal 113 of information will be described subsequently with reference to FIG. 9.

First at step 1, a person who wants to acquire information will insert an information recording and reproduction apparatus 1011 into the information furnishing apparatus 1001 and perform output selection using the output selection section 1006. At step 2, the control section 1005 receives the output selection information 104. Further at step 10, communication 201 is performed between the control section 1005 and the write management section 1015. Then, certification of the write management section 1015 is performed by a method which will be hereinafter described. If the justice of the write management section 1015 is thus proved at step 3, then a time number 202 necessary for acquisition of the information is transmitted to the write management section 1015. But on the contrary if the justice of the write management section 1015 is not proved at step 3, processing at step 4 is executed. At step 4, it is displayed on the display section 1007 that the justice is not proved and copy prohibition processing 1 such as to discharge the information recording and reproduction apparatus 1011 is performed.

On the other hand, the write management section 1015, whose justice has been proved at step 5, receives, at step 11, the time number information necessary to acquire the information. At step 12, the write management section 1015 compares the necessary time number information with remaining time number information D held by the write management section 1015 itself. Then, if the necessary time number is equal to or smaller than the remaining time number, then a copy request signal 203 is transmitted to the control section 1005 at step 13. At step 6, the control section 1005 receives the copy request signal 203. At step 7, information on the information recording medium 1003 is transmitted as information 103 to the information recording and reproduction apparatus 1011. Then at step 14, the information recording and reproduction apparatus 1011 receives and records the information 103. Then at step 15, the remaining time number is decremented.

On the contrary if the necessary time number is greater than the remaining time number at step 12, the write management section 1015 receives a copy prohibition processing 2 request signal 205 at step 16. At step 8, the control section 1005 receives the copy prohibition processing 2 request signal 205. Then at step 9, such a copy prohibition processing 2 that it is displayed on the display section 1007 that copying is prohibited is executed. In this manner, the copy prohibition processing 2 is performed since communication of information is performed or the necessary time number is greater than the remaining time number.

By the way, after such processing as described above, the person who wants to acquire information sometimes wants to acquire additional or different information. In this instance, if a sufficient recording area can be assured on the information recording medium 1012, then the person who wants to acquire information will input it into the information recording apparatus that it is desired to acquire different information. Then, the information furnishing apparatus 1001 and the information recording and reproduction apparatus 1011 may repeat such processes as described above. It is to be noted that an effective period may possibly be recorded in place of the remaining time number as write management information. In this instance, the write management section 1015 performs not comparison between the necessary time number and the remaining time number but comparison between the date and the time at present and the effective period in response to a clock signal not shown. Then, such processing as corresponds to decrementing of the remaining time number is unnecessary.

Figure 10:
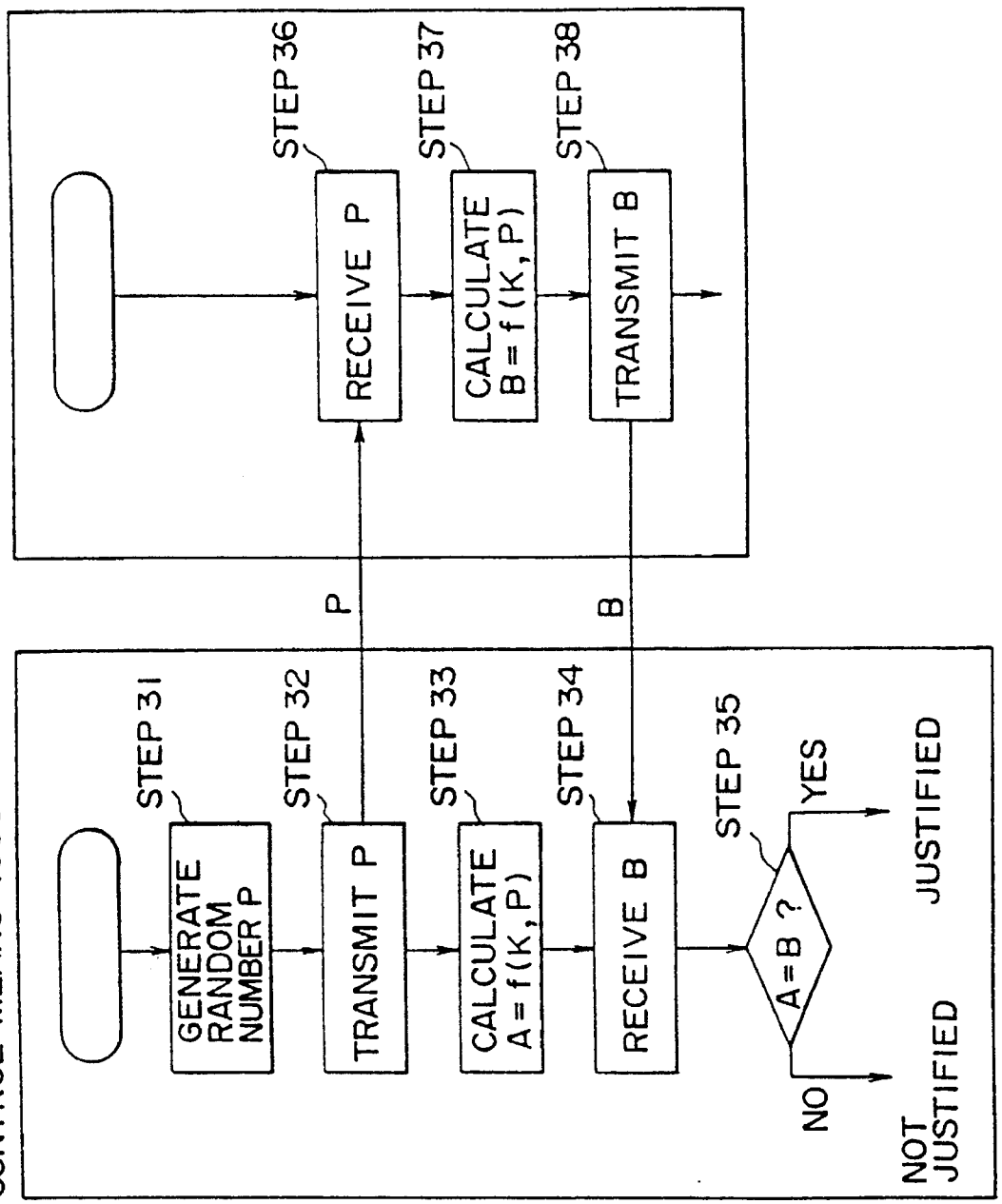
FIG. 10 is a flow chart illustrating communication for certification illustrated in FIG. 9.

FIG. 10 illustrates in flow chart the communication 201 for certification illustrated in FIG. 9. First at step 31, the control section 1005 generates a random number P. At step 32, the random number P is transmitted to the write management section 1015. Then at step 33, the value A of a function f(K, P) which relies upon the secret key K and the random number P is calculated.

On the other hand, at step 36, the write management section 1015 receives the random number P. Then also at step 37, the value B of the function f(K, P) is calculated. At step 38, the value B is transmitted to the control section 1005. At step 34, the control section 1005 receives the value B and compares the value A and the value B with each other. If the values A and B are equal to each other at step 35, then it is determined that the write management section 1015 holds the correct value of the secret key K and is justified to perform correct settlement of accounts. On the contrary if the values A and B are not equal to each other, then it is determined that the write management section 1015 is unjustified.

Here, the method of certification may alternatively be such that, for example, the secret key K held by the write management section 1015 is transmitted directly to the control section 1005 and then the control section 1005 checks whether or not the correct value of the secret key K has been transmitted thereto. However, where the method executed by the present information furnishing and collection system is employed, since the secret key K will not go out of the control section 1005 or the write management section 1015, the security is higher. Further, a different method which makes use of an open key code which will be hereinafter described can be used as the method of certification.

Figure 11:
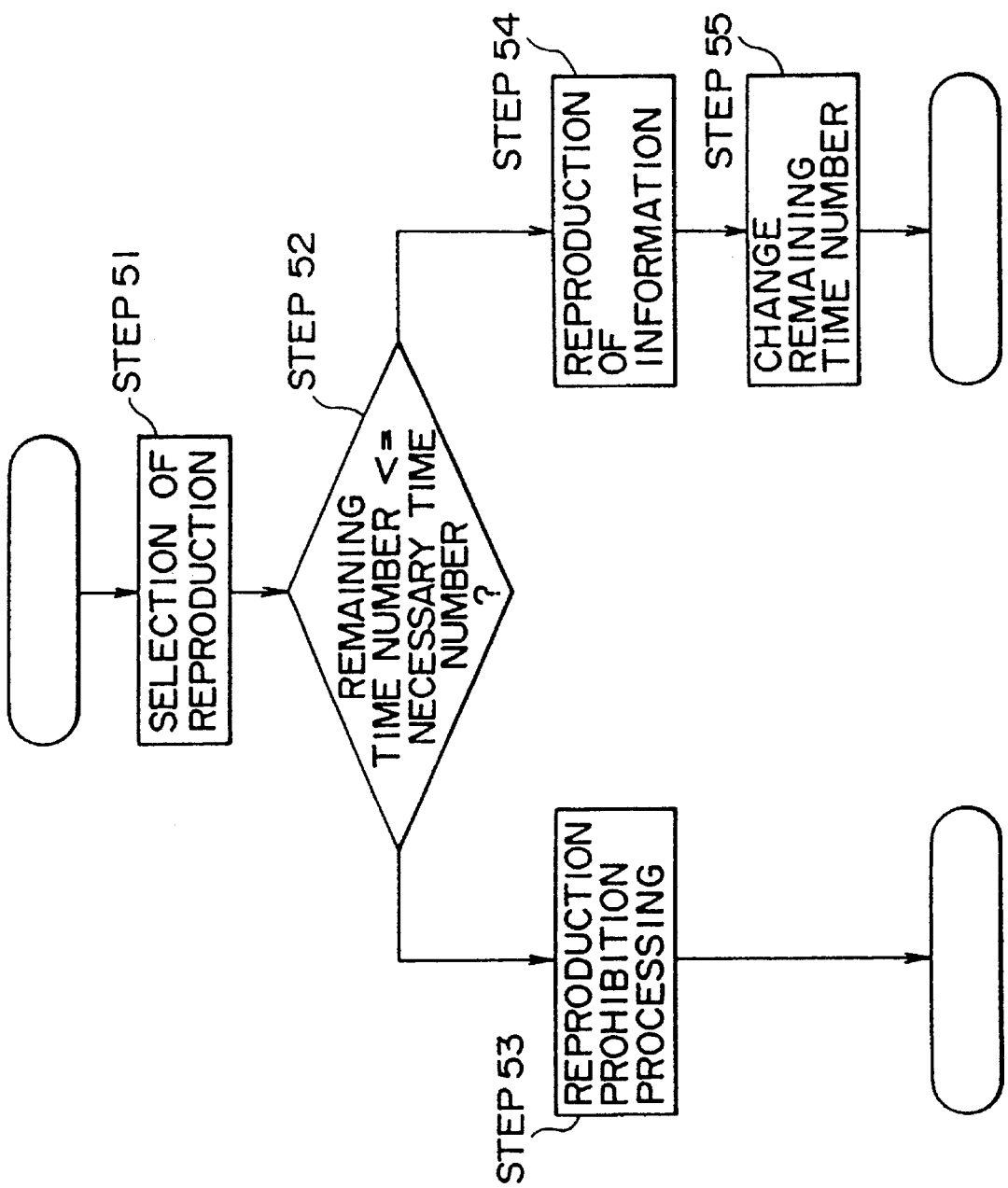
FIG. 11 is a flow chart illustrating processing of the information furnishing and collection system of the present invention when the write management section performs settlement of accounts for use of information not upon recording of information but upon reproduction of information.

FIG. 11 illustrates in flow chart a flow of processing of the information furnishing and collection system to which the present invention is applied when settlement of accounts for use of information is performed not upon recording of information but upon reproduction by the write management section 1015. Referring to FIG. 11, at step 51, reproduction selection is performed to determine what part of information recorded in the information recording medium 1012 is to be reproduced. At step 52, the write management section 1015 checks whether or not the remaining time number is equal to or greater than a time number necessary for reproduction, and if the determination is in the affirmative, then processing at step 54 is executed. Consequently, information is reproduced. Then at step 55, the remaining time number is decremented. On the other hand, if the remaining time number is smaller than the necessary time number at step 52, such reproduction prohibition processing as to cause the display section 1017 to display that the remaining time number is smaller than the necessary time number is executed at step 53.

It is to be noted that an effective period may possibly be recorded in place of the remaining time number. In this instance, the write management section 1015 performs not comparison between the necessary time number and the remaining time number but comparison between the date and the time at present and the effective period in response to a clock signal not shown. Then, in this instance, such processing as corresponding to decrementing of the remaining time number is unnecessary. It is to be noted that, when write management is performed in this manner upon reproduction, writing onto the recording medium need not necessarily be performed by way of the information furnishing apparatus. For example, information recorded on a mask ROM (read only memory) may be reproduced and settlement of accounts may be performed for the information by the method described above.

Figure 12:
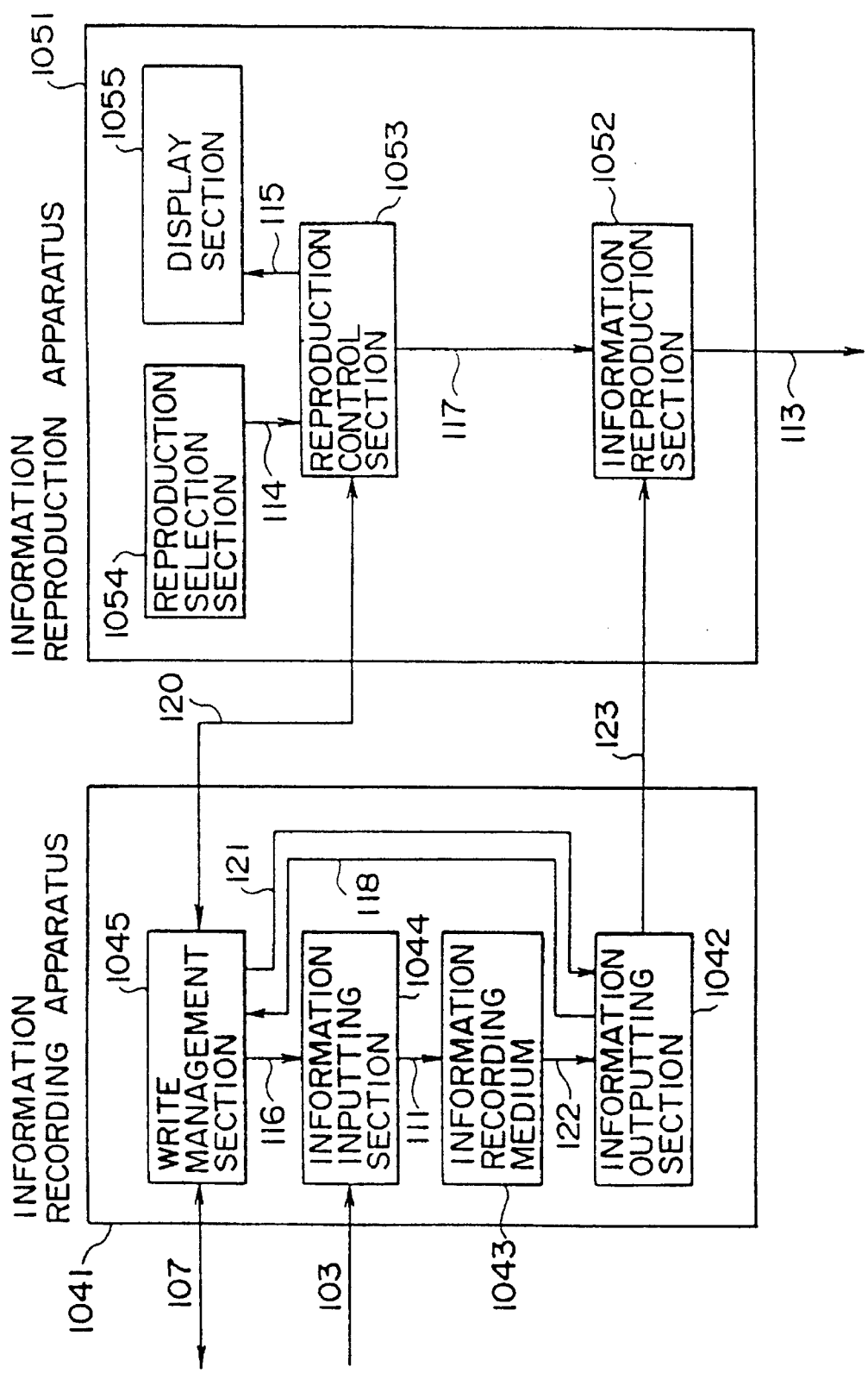
FIG. 12 is a block diagram showing the construction of the information recording and reproduction apparatus shown in FIG. 2.

FIG. 12 shows in block diagram the construction of the information recording and reproduction apparatus shown in FIG. 2. Referring to FIG. 12, the information recording and reproduction apparatus includes information recording apparatus 1041 and an information reproduction apparatus 1051 which are formed separately from each other. A write management section 1045 is connected to an information inputting section 1044 and an information outputting section 1042, and the information inputting section 1044 is connected to an information recording medium 1043. The information recording medium 1043 is connected to the information outputting section 1042. The information recording apparatus 1041 is constituted from the components listed above.

Meanwhile, an information reproduction section 1052 is connected to a reproduction control section 1053, which is in turn connected to a reproduction selection section 1054 and a display section 1055. The information reproduction apparatus 1051 is constituted from the components listed just above. The information outputting section 1042 is connected to the information reproduction apparatus 1051, and the write management section 1045 is connected to the reproduction control section 1053. It is to be noted that the information recording apparatus 1041 is mounted on a card.

The write management section 1015 shown in FIG. 6 is divided in function between the write management section 1045 and the reproduction control section 1053. In operation, if write management is performed when information is recorded onto the information recording medium 1043, the write management section 1045 functions similarly to the write management section 1015 of FIG. 6. On the other hand, when write management is performed upon reproduction from the information recording medium 1043, the write management section 1045 and the reproduction control section 1053 function similarly to the write management section 1015 of FIG. 6 through communication 120 between them.

It is to be noted that, in this instance, the write management section 1045 controls the output of the information outputting section 1042 using a control signal 121. Consequently, reproduction of information is enabled or disabled. Naturally, a similar function can be achieved alternatively by controlling the output itself of the information recording medium 1043. It is to be noted that, in order to prevent information to be reproduced by an unjustified reproduction apparatus, certification of the information reproduction apparatus 1051 of the information recording apparatus 1041 may be performed, for example, prior to reproduction selection.

In the present invention, such write management information as a remaining time number has an important role.

Then, such write management information can be updated readily with security using a justified write management information updating apparatus. This will be described subsequently.

FIG. 13 shows the appearance of a write management information updating apparatus. Referring to FIG. 13, the write management information updating apparatus shown has an inlet/outlet opening formed in a front face thereof for inserting and discharging an information recording (reproduction) apparatus into and from the write management information updating apparatus. The write management information updating apparatus further has a coin throwing in opening formed in the front face thereof. In operation, when updating of write management information is required, an information recording (reproduction) apparatus is inserted into the inlet/outlet opening and a necessary charge is thrown into the coin throwing in opening. It is to be noted that the write management information updating apparatus may naturally be managed by hand of an operator and the operator may receive the charge from a person who wants to update information and insert the information recording (reproduction) apparatus into the inlet/outlet opening.

FIG. 14 shows in block diagram the construction of a write management section and the write management information updating apparatus shown in FIG. 13. It is to be noted that, in FIG. 14, those components which do not relate directly to updating of write management information are omitted. Referring to FIG. 14, the write management section 1015 includes, in addition to the components shown in FIG. 8, a random number generation section 1033, and a decoding key L as encoded key information and remaining time number information D are recorded in the memory 1031. The significance and the action of the decoding key L will be hereinafter described. The random number generation section 1033 and the memory 1031 are connected to the CPU 1032. Meanwhile, the write management information updating apparatus 1061 includes a memory 1062, a CPU 1063 and a coin acceptance section 1064. An encoding key M is recorded in the memory 1062. The encoding key M is paired with the decoding key L mentioned above, and the significance and the action of the encoding key M will also be hereinafter described. The memory 1062 and the coin acceptance section 1064 are connected to the CPU 1063. The CPU 1032 and the CPU 1063 perform communication 301 between them to effect updating of write management information.

FIG. 15 illustrates in flow chart processing of the write management section 1015 and the write management information updating apparatus 1061 shown in FIG. 14. Referring to FIG. 15, if the write management section 1015 is inserted into the write management information updating apparatus 1061, then the certification 302 of the write management information updating apparatus 1061 is started by the write management section 1015 at step 61. If it is determined, at step 62, from a result of the certification that the write management information updating apparatus 1061 is justified, then preparations for processing for updating of the remaining time number are performed at step 63. On the contrary if it is determined at step 62 that the write management information updating apparatus 1061 is not justified, then remaining time number updating prohibition processing is performed. Here, while the remaining time number updating prohibition processing may merely be doing nothing, prohibition of updating the remaining time number may be transmitted to the write management information updating apparatus 1061.

In the processing for updating the remaining time number, after certification is started at step 65, the write management information updating apparatus 1061 checks at step 66 that a coin or coins have been thrown in. Then at step 67, the amount 303 thus thrown in is transmitted to the write management section 1015. At step 63, the write management section 1015 receives the amount 303, and at step 64, the write management section 1015 decreases the remaining time number in accordance with the thus received amount. Meanwhile, the write management information updating apparatus discharges the information recording (reproduction) apparatus from the outlet opening.

FIG. 16 illustrates a flow of processing in certification of the arrangement shown in FIG. 14. The method of certification may be performed such that, for example, similarly as described hereinabove with reference to FIG. 10, certification is performed using a common secret key between the write management section 1015 and the write management information updating apparatus 1061. Where the method is adopted, however, if information of the secret key recorded in the write management section 1015 leaks to the output, then it is possible to produce an unjustified write management information updating apparatus.

Generally, a justified write management information updating apparatus can be managed strictly. However, since an information recording (reproduction) apparatus is used by a large number of people, it is difficult to manage it strictly. Besides, if even one of write management information updating apparatus becomes unjustified or is involved, then there is the possibility that the remaining numbers in the other large number of information recording (reproduction) apparatus can be updated by way of the unjustified write management information updating apparatus. Therefore, the present information furnishing and collection system makes use of certification which employs an open key code.

Details of such open key code are disclosed, for example, by Dorothy Elizabety Robling Denning, "Cryptography and Data Security", Addison-Wesley Publishing Company, Inc., Reading, Mass., U.S.A., 1982 and its Japanese translation by Tadahiro Kamizono, Kaku Kojima and Akiko Okushima, from Baifukan. If the technique is employed, then an encoding key to be used upon encoding of information and a decoding key to be used upon decoding of coded information can be set separately from each other. Besides, the encoding key and the decoding key can be constructed so that, even if the decoding key is known, it is very difficult to know the encoding key from the decoding key, and this enhances the security.

The processing procedure for certification illustrated in FIG. 16 will be described subsequently. Referring to FIG. 16, first at step 81, the write management section 1015 generates a random number Q. At step 82, the random number Q is transmitted to the write management information updating section 1061. Then at step 86, the write management information updating section 1061 calculates the value R of a function e(M, Q) which relies upon an encoding key (M) and the random number Q (encipherment or encoding). At step 88, the value R is transmitted to the write management section 1015, and at step 83, the value R is received by the write management section 1015. At step 84, the write management section 1015 calculates the value S of a function d (L, R) which relies upon a decoding key L and the value R (decoding). At step 85, it is checked whether or not the value S is equal to the random number Q. Then, if the value S and the random number Q are equal to each other, then it is determined that the write management information updating apparatus 10 is justified. On the contrary if the value S and the random number Q are not equal to each other, then it is determined that the write management information updating apparatus 1061 is not justified.

As described above, in the information furnishing and collection system of the present invention, not the information furnishing apparatus on the information copying side but the information recording (reproduction) apparatus has a function of cooperating with the information recording medium to effect write management such as settlement of accounts. Consequently, settlement of accounts can be performed not only upon recording onto the information recording medium but also upon reproduction. Further, also in the case of the settlement of accounts upon recording, the person who acquires information can be prevented from suffering from excessive burden. Further, according to the method in the information furnishing and collection system of the present invention, the inlet opening and the outlet opening for insertion and discharging of a recording medium into and from the information recording apparatus are separate from each other. Consequently, a large number of utilizers can successively utilize the information recording apparatus as each of them inserts a recording medium into the inlet opening and then walks to the outlet opening. Further, the encoding key can be constructed so that it is very difficult for a third person to know it, which enhances the security.

Figure 17:
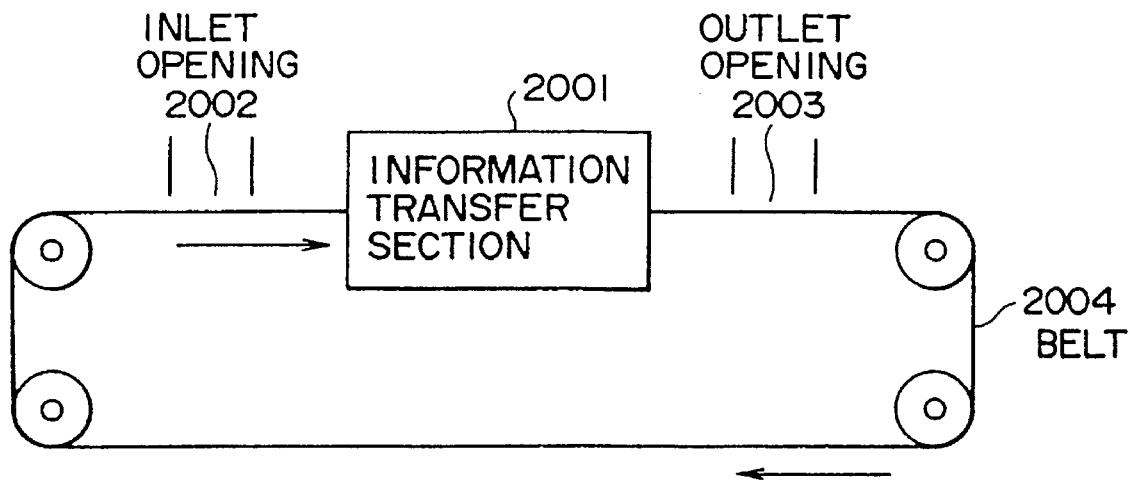
FIG. 17 is a schematic diagrammatic view showing the internal construction of the information furnishing apparatus shown in FIG. 4.

FIG. 17 shows the internal construction of the information furnishing apparatus shown in FIG. 4. Referring to FIG. 17, an inlet opening 2002 and an outlet opening 2003 are communicated with each other by a belt 2004 past an information transfer section 2001.

In operation, an information recording apparatus inserted into the information furnishing apparatus through the inlet opening 2002 is fed to the information transfer section 2001 by the belt 2004. Then in the information transfer section 2001, information is recorded onto the recording medium in the information recording apparatus. Thereafter, the information recording apparatus is carried by the belt 2004 to and discharged from the outlet opening 2003. Naturally, the information recording apparatus may be fed not by the belt 2004 but by, for example, high pressure air.

Figure 18:
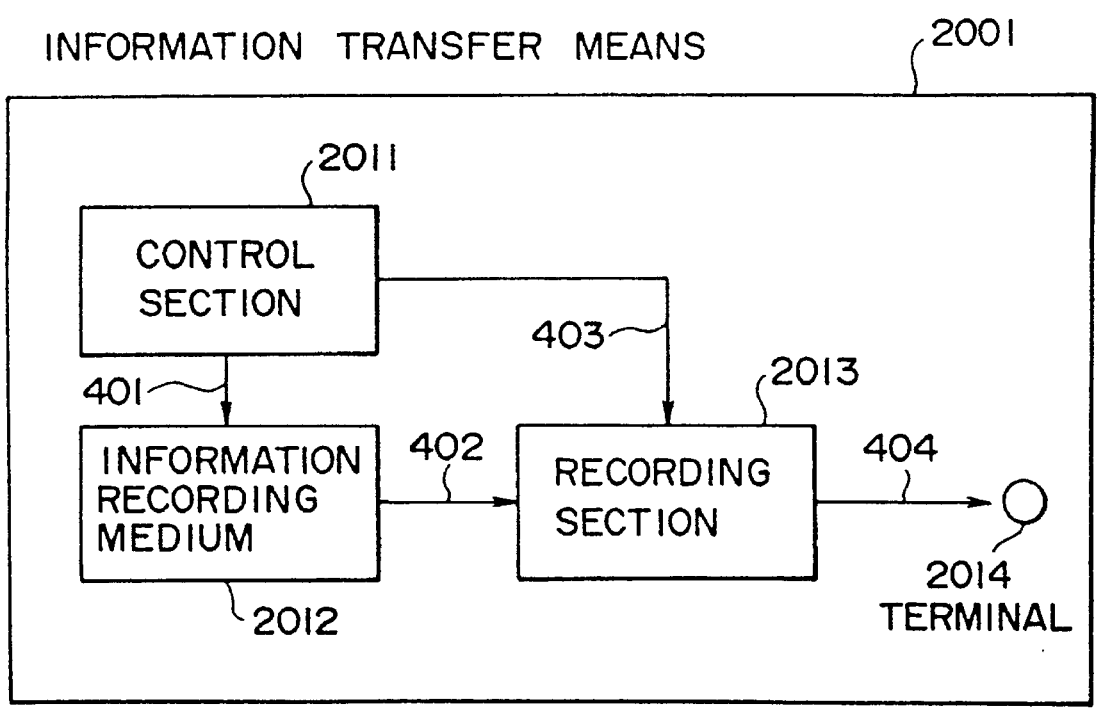
FIG. 18 is a block diagram showing an internal construction of an information transfer section of the information furnishing apparatus shown in FIG. 17.

FIG. 18 shows the internal construction of the information transfer section 2001. Referring to FIG. 18, the information recording medium 2012 is constituted, for example, from a semiconductor memory. A control section 2011 is connected to a recording section 2013 and an information recording medium 2012. The information recording medium 2012 and the recording section 2013 are connected to each other. Further, a terminal 2014 is connected to the recording section 2013.

In operation, information 402 recorded on the information recording medium 2012 is sent to the recording section 2013 in response to a control signal 401 from the control section 2011. Further, information 404 outputted from the recording section 2013 is sent to a terminal of the information recording apparatus by way of the terminal 2014. The information 404 is recorded onto the information recording medium in the information recording apparatus by operation of the recording medium 2013 in response to a control signal 403.

Figure 19:
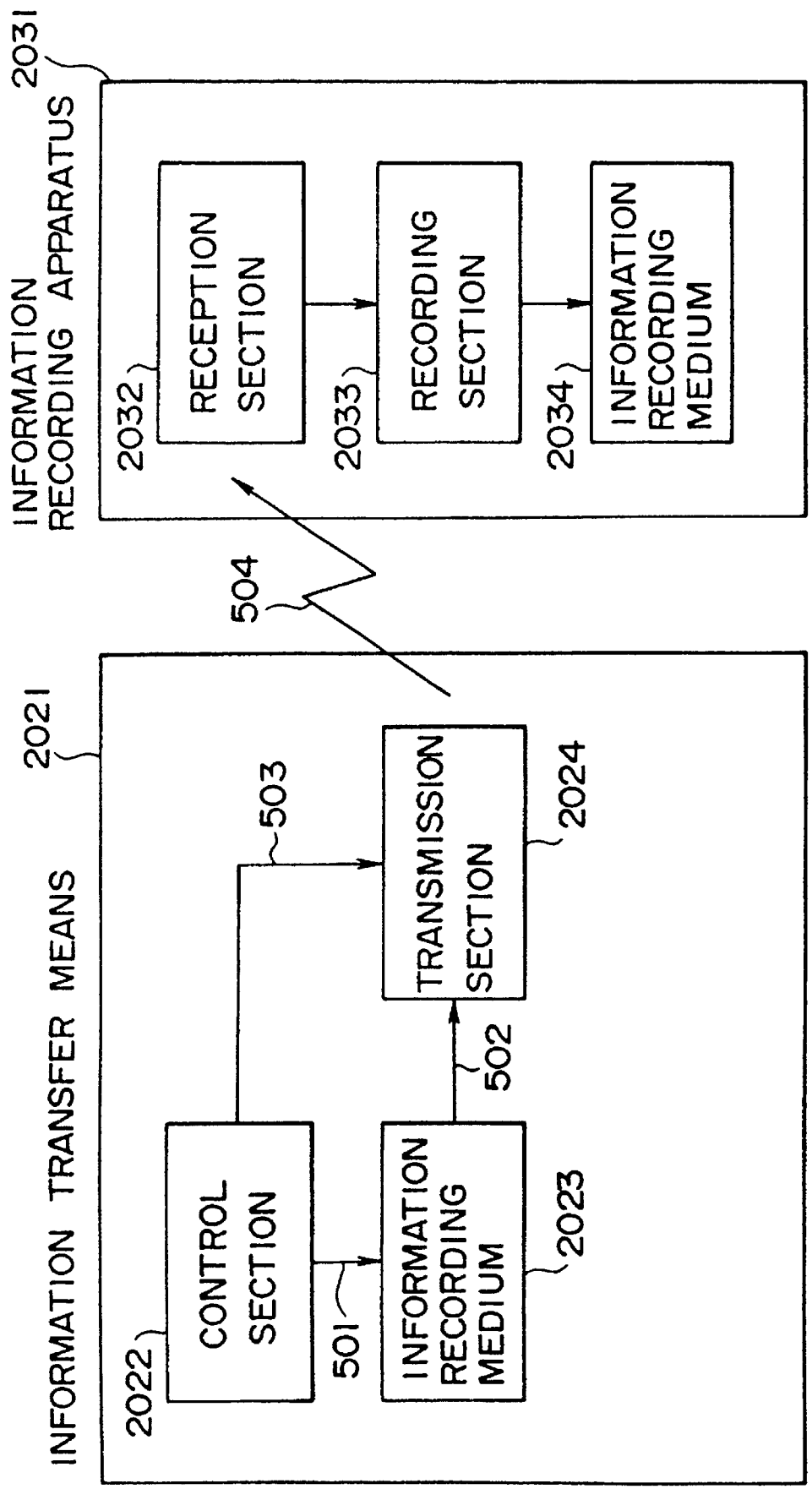
FIG. 19 is a block diagram showing another internal construction of the information transfer section of the information furnishing apparatus shown in FIG. 17.

FIG. 19 shows another internal construction of the information transfer section. In the present information transfer section, transfer of information is performed by a non-contacting method. Referring to FIG. 19, an information transfer section 2021 is constituted from a control section 2022, an information recording medium 2023, and a transmission section 2024. The control section 2022 is connected to the transmission section 2024 and the information recording medium 2023. The information recording medium 2023 and the transmission section 2024 are connected to each other. The transmission section 2024 is communicated with a reception section 2032 in an information recording apparatus 2031 by means of, for example, electromagnetic waves. Meanwhile, the information recording apparatus 2031 includes, in addition to the reception section 2032, a recording section 2033 and an information recording medium 2034. The reception section 2032 is connected to the recording section 2033, and the recording section 2033 is connected to the information recording medium 2034.

In operation, information recorded on the information recording medium 2023 is sent to the transmitting section 2024 in response to a control signal 501 from the control section 2022. The transmission section 2024 thus transmits information 504 to the reception section 2032 in the information recording apparatus 2031 in response to a control signal 503 by suitable means such as electromagnetic waves. The information 504 is recorded onto the information recording medium 2034 by operation of the recording section 2033.

As described above, in the information furnishing and collection system of the present invention, the inlet opening 2002 and the outlet opening 2003 for insertion and discharging of a recording medium into and from the information furnishing apparatus are formed separate from each other. Then, a utilizer first inserts a recording medium into the inlet opening 2002 and then walks to the outlet port 2003. Consequently, a large number of utilizers can successively utilize the information furnishing apparatus.

Figure 20:
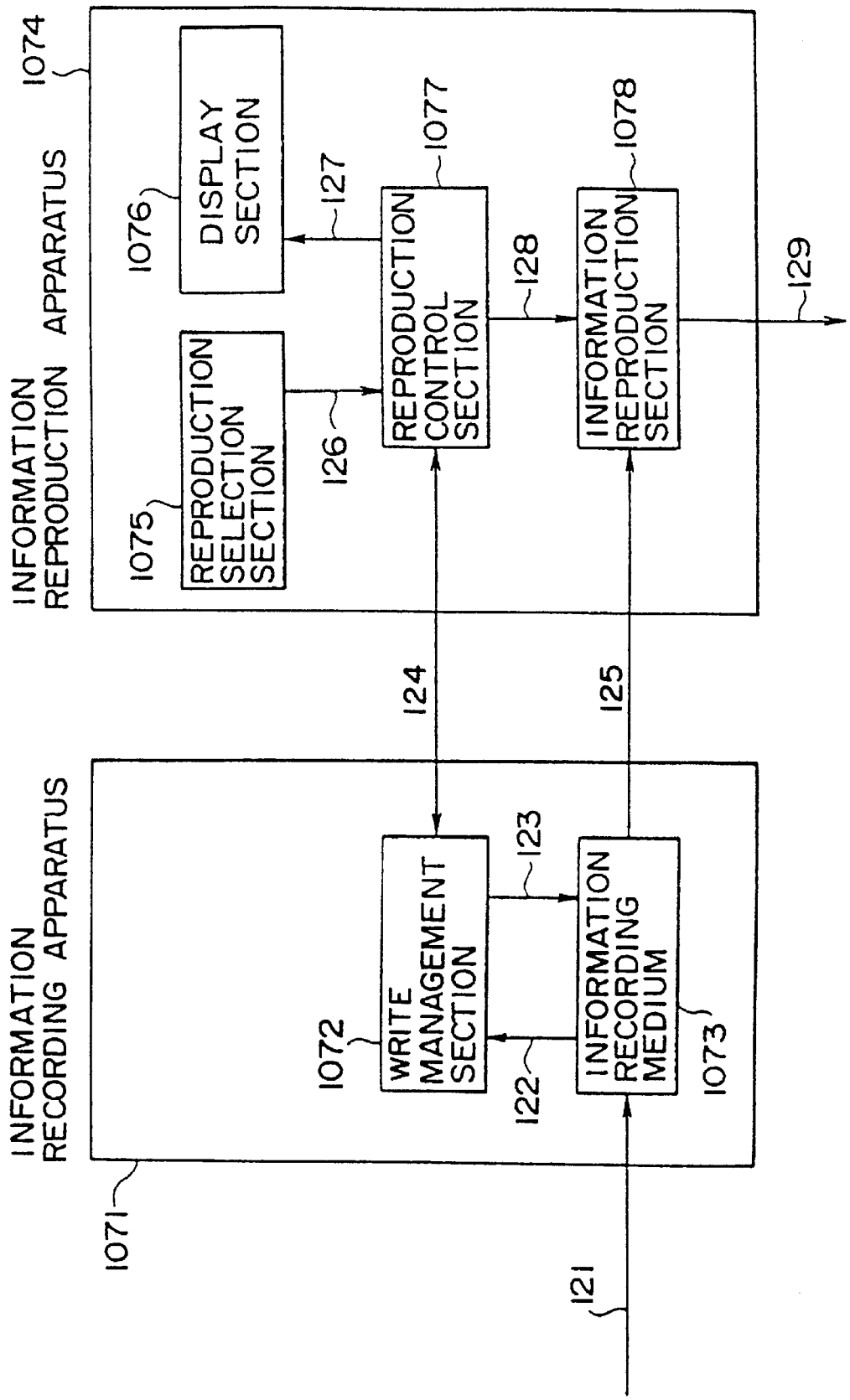
FIG. 20 is a block diagram showing the construction of an information recording apparatus and an information reproduction apparatus of the information transfer section shown in FIG. 19.

FIG. 20 shows in block diagram the information recording apparatus of FIG. 19 and an information reproduction apparatus. Referring to FIG. 20, an information recording apparatus 1071 includes an information recording medium 1073 and a write management section 1072. The write management section 1072 is constituted, for example, from a CPU and a memory. Right for reproducing information recorded on the information recording medium is recorded in the memory. The write may be, for example, a remaining time number representative of how many times information in the information recording medium can be reproduced. The information recording medium 1073 is connected to the write management section 1072. Meanwhile, an information reproduction section 1078 is connected to a reproduction control section 1077, which is in turn connected to a reproduction selection section 1075 and a display section 1076. The reproduction control section 1077 is connected to a reproduction selection section 1075 and a display section 1076. The reproduction selection section 1075, the display section 1076 and the reproduction control section 1077 constitute the information reproduction apparatus 1074.

In operation, the write management section 1072 first reads out, from within information recorded in the information recording medium 1073, information 122 representative of the type of the information itself, the time number of write necessary for reproduction and so forth. Then, a signal 124 is transmitted to the reproduction control section 1077. The reproduction control section 1077 thus sends a signal 127 to the display section 1076 so that contents of the signal 124 are displayed on the display section 1076. A person who wants to utilize information will select, using the reproduction selection section 1075, which one of information items recorded on the information recording medium 1073 is to be reproduced. Consequently, the selection information 126 is transmitted to the reproduction control section 1077. The selection information 126 is further sent to the write management section 1072 by communication 124. The write management section 1072 thus checks to detect whether or not the remaining time number is equal to or greater than a number of times necessary to reproduce the information. Then, if the remaining time number is equal to or greater than the time number necessary to reproduce the information, then it is determined that the information can be reproduced. Further, the remaining time number is decremented by the necessary time number.

On the contrary if the remaining time number is smaller than the time number necessary to reproduce the information, then it is determined that the information cannot be reproduced. If the information can be reproduced, then a control signal 123 is transmitted to the information recording medium 1073. Further, communication 124 is transmitted to the reproduction control section 177. Thus, the information recording medium 1073 outputs the information 125 recorded thereon. The information 125 is transmitted to the information reproduction section 1078. A control signal 128 for reproduction of information is transmitted from the reproduction control section 1077 to the information reproduction section 1078. Then, the information reproduction section 1078 converts the received information 125 into and outputs an audio signal 129 or the like.

In this manner, where the information recording apparatus and the information reproduction section 1078 shown in FIG. 20 are used, selection of and settlement of accounts for utilization of information can be realized upon reproduction.

Figure 21:
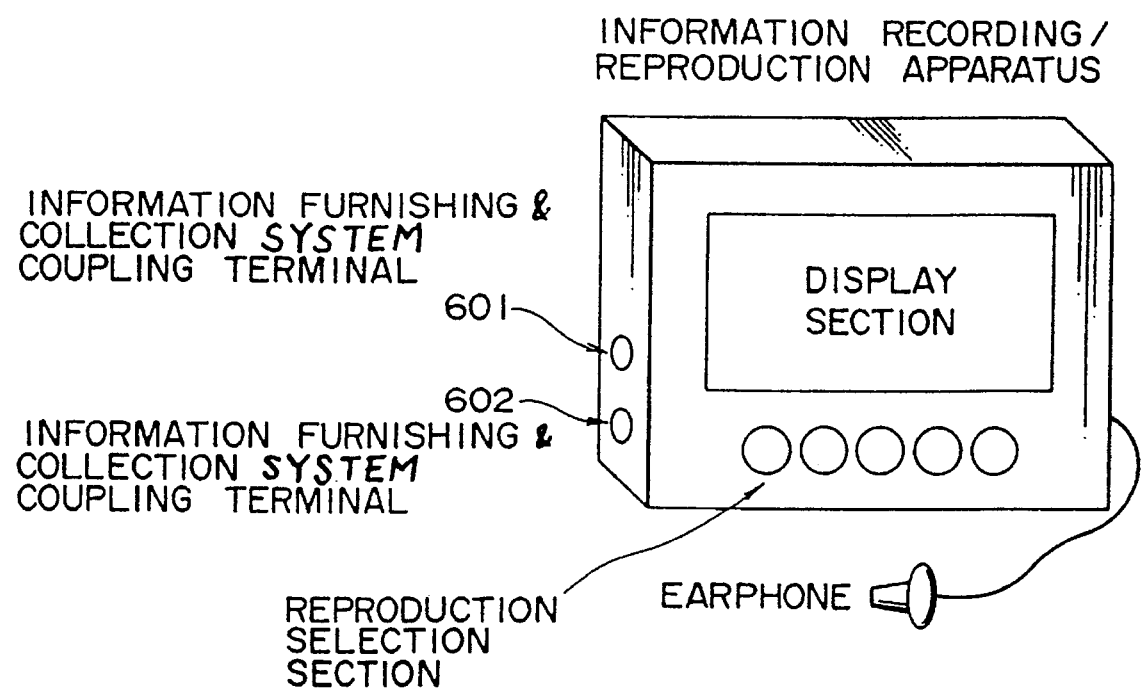
FIG. 21 is a schematic perspective view showing the appearance of another information recording/reproduction apparatus in the information furnishing and collection system of the present invention in which furnishing of information and collection of information can be performed readily at a time.

FIG. 21 shows the appearance of an information recording and reproduction apparatus by which furnishing of information and collection of information can be performed simultaneously and readily. Referring to FIG. 21, the information recording and reproduction apparatus shown has a display section and a selection section provided on a front face thereof. Further, the information recording and reproduction apparatus has an earphone and a pair of information furnishing and collection system coupling terminals 601 and 602 provided on the opposite side faces thereof.

In operation, information is copied from an information furnishing apparatus onto a recording medium installed in the information recording and reproduction apparatus by way of the information furnishing and collection system coupling terminal 601. Further, information is transferred from the recording medium installed in the information recording and reproduction apparatus to the information furnishing apparatus by way of the information furnishing and collection system coupling terminal 602. It is to be noted that the information furnishing and collection system coupling terminals 601 and 602 may be constituted from a single terminal which is changed over suitably when it is to be used. Contents of information recorded in the information recording and reproduction apparatus are displayed on the display section provided on the information recording and reproduction apparatus. Based on the displayed contents on the display section, a user of the information recording and reproduction apparatus can selectively reproduce necessary information using selection buttons provided on the reproduction selection section. Also the user can input some other selection information.

Figure 22:
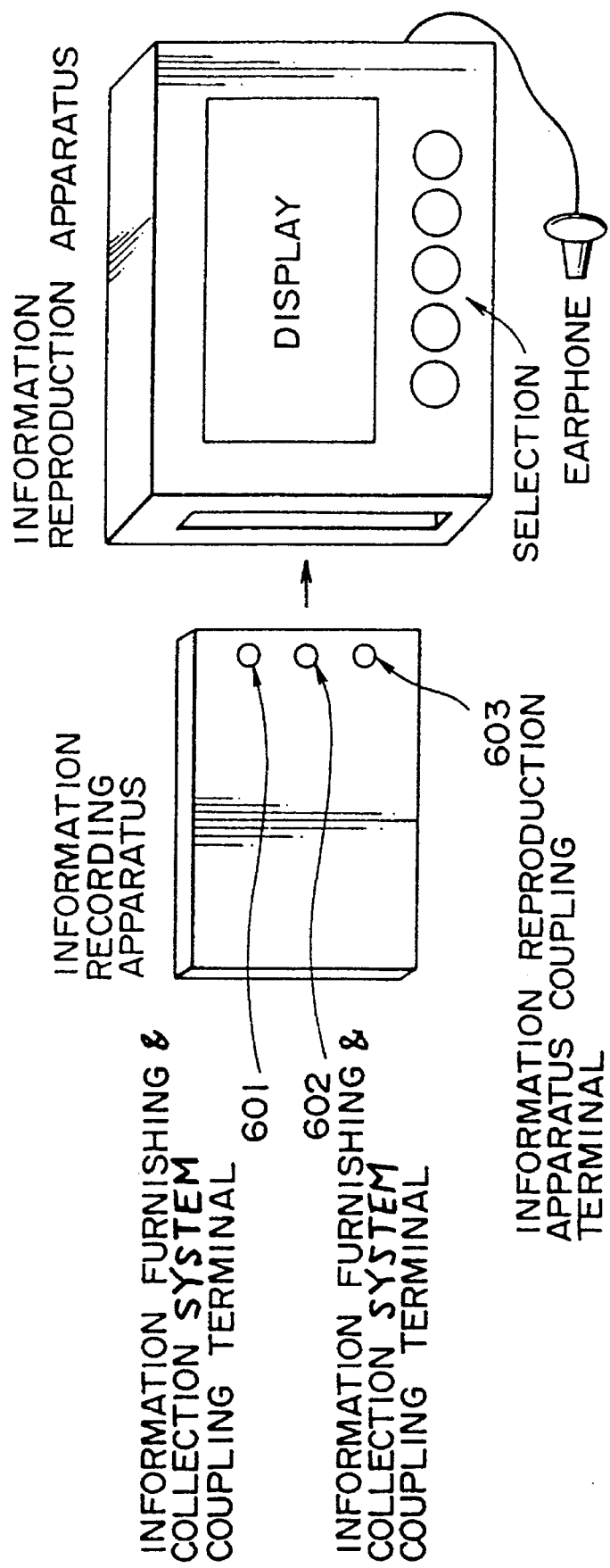
FIG. 22 is a schematic perspective view showing the appearance of a modification to the information recording/reproduction apparatus shown in FIG. 20.

FIG. 22 shows the appearance of a modification to the information recording and reproduction apparatus of FIG. 21. The present information recording and reproduction apparatus is modified such that the information recording and reproduction apparatus of FIG. 21 is physically separated into an information recording apparatus and an information reproduction apparatus. Components of the information recording apparatus are mounted on a single card. Like elements to those of the information recording and reproduction apparatus shown in FIG. 21 are denoted by like reference numerals, and detailed description thereof is omitted herein to avoid redundancy. The information recording and reproduction apparatus of FIG. 22 further has an information reproduction apparatus coupling terminal 603.

In operation, information is copied from an information furnishing apparatus onto a recording medium installed in the information recording and reproduction apparatus by way of the information furnishing and collection system coupling terminal 601. Further, information is transferred from the recording medium installed in the information recording and reproduction apparatus to the information furnishing apparatus by way of the information furnishing and collection system coupling terminal 602. It is to be noted that the information furnishing and collection system coupling terminals 601 and 602 may be formed from a single terminal which is changed over suitably when it is to be used. Upon reproduction, communication of data and control signals is required between the information recording apparatus and the information reproduction apparatus. Thus, the information reproduction apparatus coupling terminal 603 for coupling the information recording apparatus and the information reproduction apparatus is provided on each of the information recording apparatus and the information reproduction apparatus. It is to be noted that the information furnishing and collection system coupling terminals 601 and 602 and the information reproduction apparatus coupling terminal 603 may be formed from a single terminal which is changed over suitably when it is to be used.

FIG. 23 shows the appearance of an information furnishing apparatus which is used together with the arrangement shown in FIG. 21 or 22. The information furnishing apparatus includes common components to those of the information furnishing apparatus shown in FIG. 3, and description of such common components is omitted herein to avoid redundancy. The information furnishing apparatus is connected to the other apparatus by way of a wired communication line serving as transmission means.

In operation, information can be transmitted from the other apparatus to the information furnishing apparatus and vice versa by way of the wired communication line. Naturally, wireless communication means may be employed instead of the wired communication line. Further, the transmission means from the information furnishing apparatus and the transmission means from the other apparatus may be formed as physically separate means. However, inputting of information to the information furnishing apparatus need not rely upon communication means, and for example, a recording medium in a recorded condition may be inserted directly into the information furnishing apparatus. Also as regards outputting of information from the information furnishing apparatus, it can be realized alternatively by removing the recording medium from within the information furnishing apparatus or by copying information onto another recording medium. Then, a person who wants to acquire information can select information to be acquired. The person who wants to acquire information will insert its information recording and reproduction apparatus or information recording apparatus into the inlet/outlet opening of the information furnishing apparatus. Then, as the desired information is copied into the information recording and reproduction apparatus or information recording apparatus, the person who wants to acquire information acquires the information. Meanwhile, information in the information recording and reproduction apparatus or information recording apparatus is collected within the period before the information recording and reproduction apparatus or information recording apparatus is discharged from the information furnishing apparatus after it has been inserted. The information is collected rapidly and readily as it is transferred into a recording medium in the information furnishing apparatus. It is to be noted that the recording medium in the information furnishing apparatus is not particularly limited, but conveniently it is constituted from an IC memory which allows copying at a high rate and allows random accessing.

Figure 24:
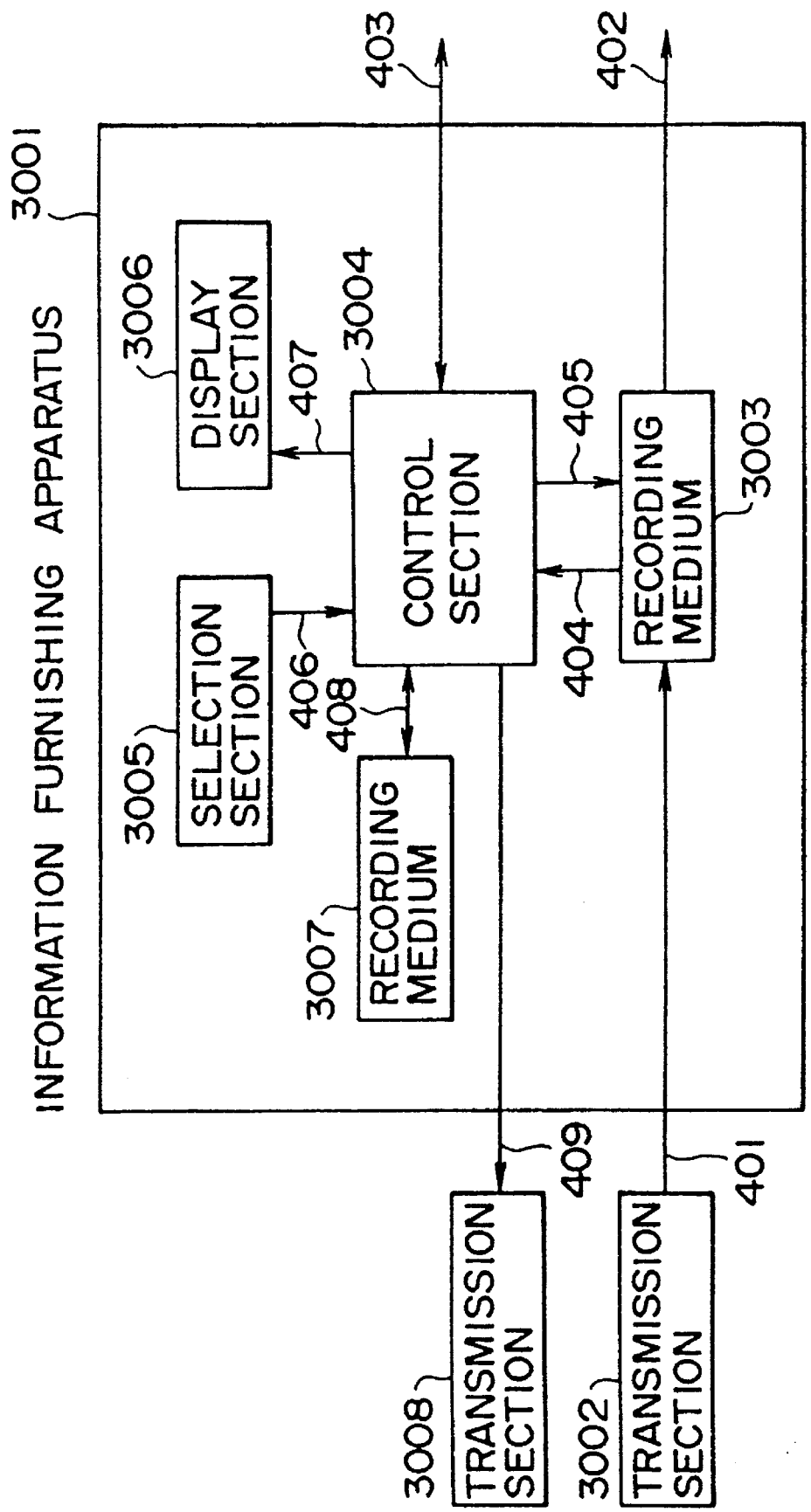
FIG. 24 is a block diagram showing the information furnishing apparatus shown in FIG. 23.

FIG. 24 shows in block diagram the information furnishing apparatus shown in FIG. 23. Meanwhile, FIG. 25 shows in block diagram the information recording and reproduction apparatus shown in FIG. 21.

Referring first to FIG. 24, a recording medium 3003 is connected to a control section 3004. Another recording medium 3007, a selection section 3005 and a display section 3006 are connected to the control section 3004. The information furnishing apparatus 3001 is constituted from the components listed above. Further, a transmission section 3008 is connected to the control section 3004, and another transmission section 3002 is connected to the recording medium 3003.

Figure 25:
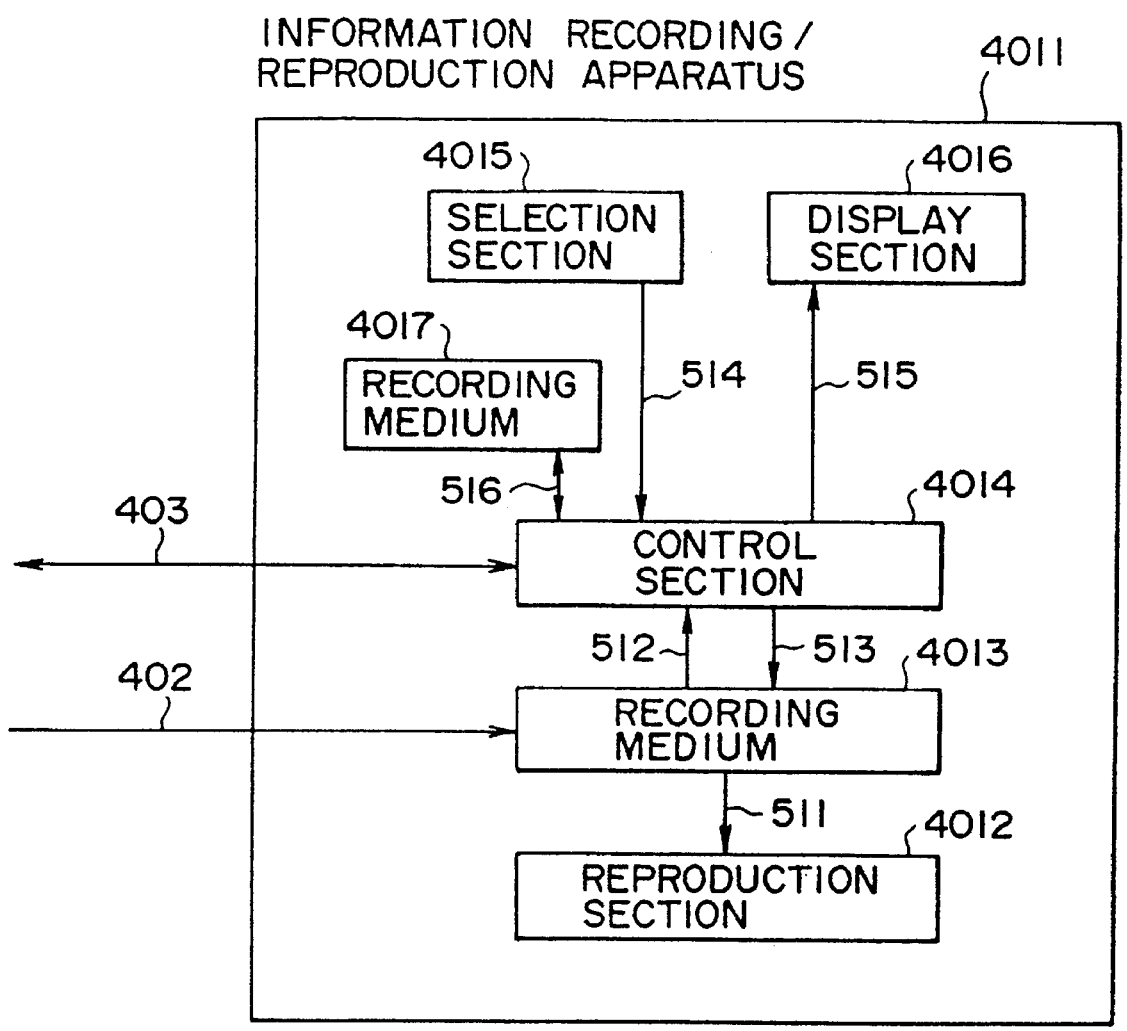
FIG. 25 is a block diagram showing the construction of the information recording/reproduction apparatus shown in FIG. 21.

Referring now to FIG. 25, a reproduction section 4012 is connected to a recording medium 4013, which is in turn connected to the control section 4014. Another recording medium 4017, a selection section 4015 and a display section 4016 are connected to the control section 4014.

In operation, in the information furnishing apparatus 3001, information 401 transmitted from the wireless or wired transmission section 3002 is recorded onto the recording medium 3003. The control section 3004 reads out information 404 representative of contents of information and so forth from the recording medium 3003 and sends it as display information 407 to the display section 3006 so that the display information 407 is displayed on the display section 3006. A person who wants to acquire information will refer to the thus displayed information and input by way of the selection means 3005 what information is to be acquired. The selection section 3005 sends a selection signal 406 to the control section 3004. The control section 3004 thus sends, based on communication 403 with the control section 4014 of the information recording and reproduction apparatus 4011, to the recording medium 3003 a control signal 405 representative of whether or not the information should be outputted. Further, the recording medium 3003 sends information 402 to the information recording and reproduction apparatus 401 under the control of the control signal 405.

Here, an example of the communication 403 between the control section 3004 and the control section 4014 will be described. The control section 4014 stores the value of write information of the information recording and reproduction apparatus 4011 to receive copying from the information furnishing apparatus 3001, such as, for example, remaining time number information D. Meanwhile, the control section 3004 transmits, when information which is desired to be copied by a person who wants to acquire information is copied, the number to be subtracted from the remaining time number information D, that is, the required time number d, to the control section 4014. The control section 4014 thus makes comparison between the remaining time number information D and the necessary time number d. Here, if D is equal to or higher than d, a copy request signal is transmitted to the control section 3004 and a value obtained by subtraction of d from D is set as a new value of the remaining time number information D. On the other hand, when D is lower than d, a copy withhold signal is transmitted to the control signal 3004. Simultaneously with or around the transmission of information 402, the information furnishing apparatus 3001 receives the communication 403 from the information recording and reproduction apparatus 4011. Here, contents of the communication 403 is such information as what information recorded in the recording medium 3003 is reproduced and how many times the information is reproduced by the information recording and reproduction apparatus 4011. The information is recorded onto the recording medium 3007. The control section 3004 reads out information 408 recorded on the recording medium 3007 after each fixed interval of time. Further, the control section 3004 applies statistic processing to the information 408 to calculate information 409 and sends out the information 409 to the transmission section 3008.

It is to be noted that the information (communication 403) transmitted from the information recording and reproduction apparatus 4011 need not necessarily be stored into the recording medium 3007 by the control section 3004. Then, the information (communication 403) may be sent out to the transmission section 3008 directly or after it is processed by statistic processing or the like. Further, even where the information (communication 403) is stored into the recording medium 3007, special statistic processing may be performed before it is sent out to the transmission section 3008. Furthermore, the information may be processed by statistic processing or like processing before it is recorded onto the recording medium 3007 by the control section 3004.

On the other hand, after acquisition of the information from the information furnishing apparatus 3001, in the information recording and reproduction apparatus 4011, the control section 4014 first reads out, in accordance with a request of the person who wants to acquire information, contents 512 or the like of the information from the recording medium 4013. Then, the information is transmitted as display information 515 to and displayed on the display section 4016. The person who wants to acquire information will refer to the thus displayed information and input by way of the selection section 4015 which information should be reproduced. The selection section 4015 sends a selection signal 514 to the control section 3014. The control section 4014 sends a control signal 513 to the recording medium 4013 in response to the selection signal 514. The recording medium 4013 outputs information 511 in response to the control signal 513. The reproduction section 4012 reproduces the information 511. Further, in the control section 4014, information 516 which relies upon inputting to the selection section 4015 is recorded onto the recording medium 4017. When the information recording and reproduction apparatus 4011 is coupled to the information furnishing apparatus 3001 for the second time, the information recorded on the recording medium 4017 is sent to the information furnishing apparatus 3001 by way of the control section 4014.

Here, the "information which relies upon inputting to the selection section 4015" may be, for example, the reproduction selection signal 514 itself. In this instance, information regarding an information reproduction utilization condition by the utilizer of the information recording and reproduction apparatus 4011 can be obtained. The "information which relies upon inputting to the selection section 4015" may alternatively be answer selection information regarding quiz information or information obtained by statistic processing of such answer selection information. In this instance, a correct answer ratio for a quiz or quizzes of the utilizer of the information recording and reproduction apparatus 4011 is obtained. Further alternatively, the "information which relies upon inputting to the selection section 4015" may be answer selection information to a questionnaire or questionnaires or information obtained by statistic processing of such answer selection information. When the information is selection information, for example, representative of that one of musical pieces reproduced from the recording medium 4013 which is most favorable to the user of the information recording and reproduction apparatus 4011, by statistically processing such selection information, it is grasped which one of the musical pieces is the most popular.

It is to be noted that information collected by a large number of information furnishing apparatus is collected to and statistically processed in a center so that more significant data regarding utilization of information is obtained. Further, the condition from the information furnishing apparatus to the information recording and reproduction apparatus may be varied in accordance with information sent from the information recording and reproduction apparatus to the information furnishing apparatus. For example, when cooperation with such a questionnaire as described above is to be made, the value of the necessary time number d for acquisition of information may be set to a comparatively low value in advance on the information furnishing apparatus. This allows a user of information to acquire information at a lower cost and allows a furnisher of the information to anticipate answers to the questionnaire from a greater number of users. Meanwhile, when quiz information is to be furnished, the value of the necessary time number d may be varied in accordance with a correct answer ratio on the information furnishing apparatus. This allows an information utilizer to enjoy the game. It is to be noted that the recording medium 3003 and the recording medium 3007 may be different portions of a single recording medium.

Figure 26:
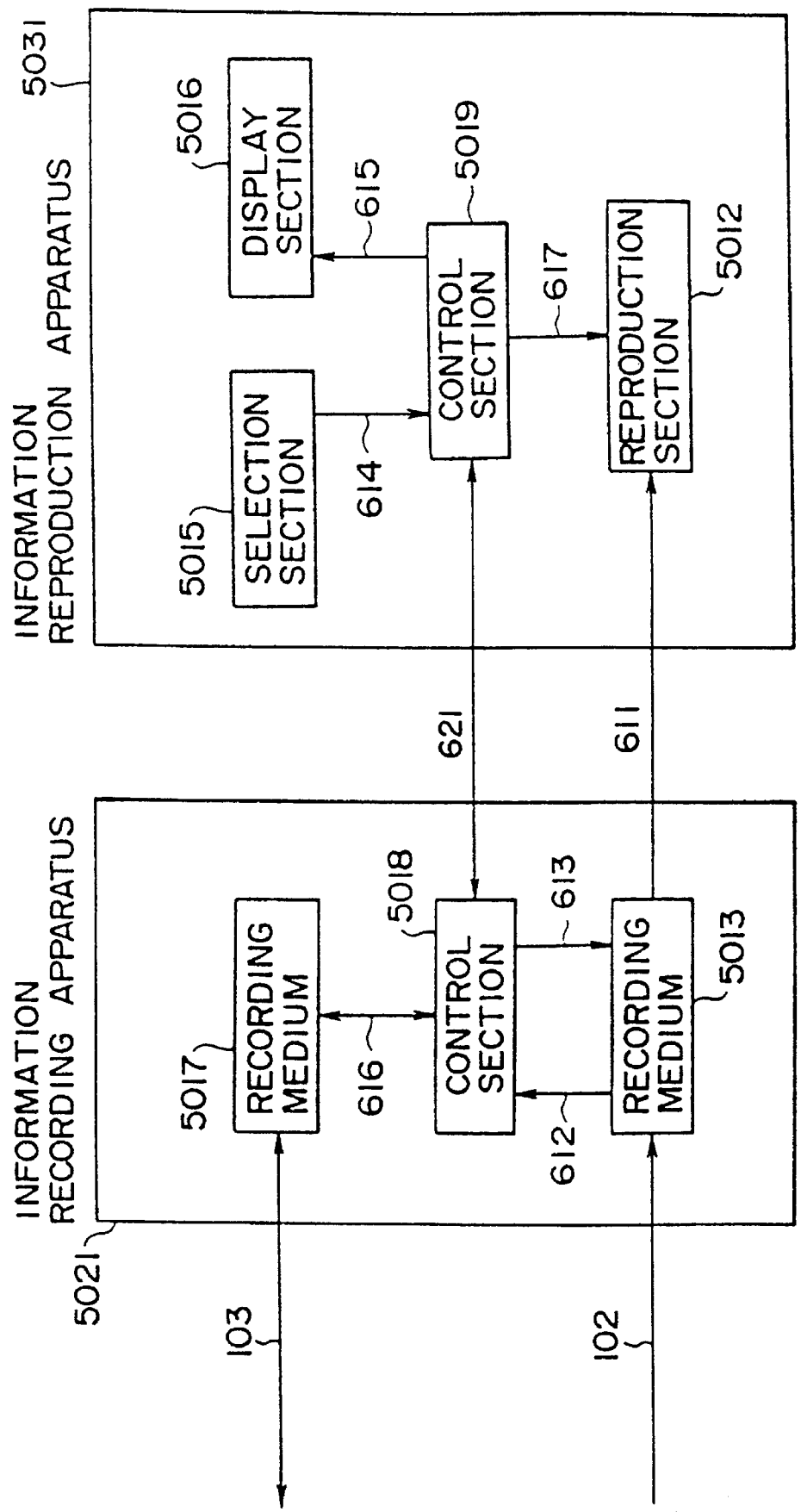
FIG. 26 is a block diagram showing the construction of the information recording apparatus and the information reproduction apparatus shown in FIG. 22.

FIG. 26 shows in block diagram the construction of the information recording apparatus and the information reproduction apparatus shown in FIG. 22. Referring to FIG. 26, a recording medium 5017 is connected to a control section 5018, which is in turn connected to a recording medium 5013. The information recording apparatus 5021 is constituted from the components listed just above. Meanwhile, a reproduction section 5012 is connected to a control section 5019. The control section 5019 is connected to a selection section 5015 and a display section 5016. The information reproduction apparatus 5031 is thus constituted from the reproduction section 5012, control section 5015, selection section 5019 and display section 5016.

In operation, the functions of the control section 4014 shown in FIG. 25 are realized by the control section 5018 and the control section 5019 as well as communication 621. First, information 102 sent out from the information furnishing apparatus 3001 is recorded onto the recording medium 5013. In accordance with a request of a person who wants to reproduce information, the control section 5018 in the information recording apparatus 5021 reads out contents 612 and so forth of information from the recording medium 5013. The information is sent as display information 615 from the control section 5019 to the display section 5016 by way of communication 121 so that it is displayed on the display section 5016. The person who wants to reproduce information will refer to the display information and input by way of the selection section 5015 which information should be reproduced. The selection section 5015 sends a selection signal 614 to the control section 5019. Then, the control section 5019 sends a control signal 613 to the recording medium 5013 by way of the control section 5018 in response to the selection signal 614. The recording medium 5013 thus outputs information 611 in response to the control signal 613. Thus, the reproduction section 5012 reproduces the information 611 in response to a control signal 617. Meanwhile, in the control section 5018, information 616 which relies upon inputting to the selection section 5015 is recorded onto the recording medium 5017. When the information recording apparatus 5021 is coupled to the information furnishing apparatus 3001 shown in FIG. 24 for the second time, the information recorded on the recording medium 5017 is sent to the information furnishing apparatus 3001 by way of communication 103.

It is to be noted that, while the information furnishing apparatus 3001 shown in FIG. 24 has both of the information furnishing function and the information collection function and accordingly is advantageous in that furnishing of information and collection of information can be performed readily at a time, this is not necessarily a requirement, and alternatively, furnishing of information may be performed by an information furnishing apparatus while collection of information is performed by a separate information collection apparatus.

As apparent from the foregoing description, in the information furnishing and collection system of the present invention, programs of music, quizzes or the like are transferred from an information furnishing apparatus to an information recording apparatus which includes a recording medium formed from an IC memory. When any of the programs is reproduced, selection information inputted by a utilizer is recorded. Then, the thus recorded information is transferred to the information furnishing apparatus. Consequently, information regarding reactions of the utilizers is obtained. Thus, the information furnisher can grasp information utilization situations or tastes of the information utilizers readily. Further, the contents of service can be enriched making use of such information.

Having now fully described the invention, it will be apparent to one of ordinary skill in the art that many changes and modifications can be made thereto without departing from the spirit and scope of the invention as set forth herein.

What is claimed is:

1. An information furnishing and collection system, comprising:

an information furnishing apparatus;

an information recording apparatus including means for communicating with said information furnishing apparatus, an information recording medium and write management means, said recording medium and said write management means being mounted on a common card capable of being connected with and disconnected from said information furnishing apparatus, and said write management means reading write management information stored in said recording medium in said information recording apparatus and generating a write management signal representative thereof; and control means for controlling the output of information from said information furnishing apparatus to said information recording apparatus, said control means determining, based upon communication with said write management means, whether to permit said write management means to perform at least one of:(1) writing information from said information furnishing apparatus to said recording medium in said information recording apparatus and (2) reproducing recorded information from said recording medium in said information recording apparatus in accordance with said write management signal.

2. An information furnishing and collection system according to claim 1, wherein said control means is responsive to the content of said stored write management information recorded on said recording medium.

3. An information furnishing and collection system according to claim 2, wherein the write management information comprises date and time information defining an effective time period within which one of recording and reproduction is allowed.

4. An information furnishing and collection system according to claim 2, further comprising an updating apparatus for updating the write management information in said writing management means.

5. An information furnishing and collection system according to claim 4, wherein said updating apparatus and said write management means each have encoded key information stored in respective memories; and said write management information is updated only after said write management means certifies that said information updating apparatus is acceptable.

6. An information furnishing and collection system according to claim 5, wherein the key information stored in memories in said information updating apparatus said write management means comprises one of an open key code, common secret key code, and encoding and decoding key codes.

7. An information recording apparatus according to claim 5, wherein the key information recorded in said information updating apparatus and the key information recorded in said write management means in the information recording apparatus have different values from each other.

8. An information furnishing and collection system according to claim 1, wherein said write management information comprises:

remaining time number information indicating at least one of a remaining number of recordings and a remaining number of reproductions;

remaining area information indicating an area of said recording medium which is available for recording; and time information; and wherein said write management means updates said write management information after one of a recording and a reproduction have been performed.

9. An information furnishing and collection system according to claim 1, wherein the information recorded on said recording medium includes the information provided by said information furnishing apparatus.

10. An information furnishing and collection system according to claim 1, wherein said recording medium is a semiconductor memory.

11. An information furnishing and collection system according to claim 1, wherein said recording medium and said write management means of said information recording apparatus are formed on a single integrated circuit chip.

12. An information furnishing and collection system according to claim 1, wherein said recording medium comprises a read-only memory and said write management means controls the reading and transferring of information from said recording medium to an information reproduction apparatus.

13. An information furnishing and collection system according to claim 1, wherein said recording medium receives information from said information furnishing apparatus and stores the received information at a location in the recording medium containing previously-stored information.

14. An information furnishing and collection system according to claim 1, wherein encoded key information is transmitted between said information furnishing apparatus and said information recording apparatus and wherein said control means and write management means allow recording of information onto said recording medium from said information furnishing apparatus based on encoded key information received from said information recording apparatus.

15. An information furnishing and collection system according to claim 14, wherein:

the encoded key information comprises an open key code, common secret key code, and encoding and decoding key codes.

16. An information furnishing and collection system according to claim 1, wherein:

said control means in said information furnishing apparatus has a central processing unit connected to a random number generating section and to a memory having key information stored therein and said write management means in said information recording apparatus has a central processing unit connected to a memory having key information;

said central processing unit in said control means provides a random number generated by said random number generating section to said write management means and calculates a first function value based upon said random number and said key information in the memory of the control means;

said central processing unit in said write management means receives said random number, calculates a second function value based upon the received random number and said key information in said memory of the write management mean, and transmits the second function value to said control means; and said control means determines that said information recording apparatus is acceptable by comparing said first function value and said second function value.

17. An information furnishing and collection system according to claim 1, further comprising:

a reproduction selection means for generating a reproduction selection signal indicative of information selected by a user and providing said reproduction selection signal to said write management means; wherein, reproduction of information is performed in response to said reproduction selection signal.

18. An information furnishing and collection system according to claim 17, wherein said reproduction selection signal is transmitted to one of said write management means and a reproduction control means connected to said write management means.

19. An information furnishing and collection system according to claim 1, wherein encoded key information is transmitted between said information furnishing apparatus and said information recording apparatus; and wherein said control means and write management means allow reproduction of information furnished by said information furnishing apparatus and stored in said recording medium based on encoded key information received from said information recording apparatus.

20. An information furnishing and collection system according to claim 1, wherein said write management means transmits identification information characteristic of the information furnishing and collection system based on the encoded information and said control means determines whether to permit said write management means to perform at least one of: (1) writing information from said information furnishing apparatus to said recording medium in said information recording apparatus and (2) reproducing recorded information from said recording medium in said information recording apparatus in accordance with said write management signal by evaluating the identification information transmitted from said write management means.

21. An information furnishing and collection system according to claim 1, wherein:

said control means in said information furnishing apparatus receives key information from said write management means and evaluates whether the correct key information has been transmitted by said write management means.

22. The information furnishing and collection system according to claim 1, further comprising:

an output selection means for generating an output selection signal indicative of information selected by a user and providing said output selection signal to said control means; wherein information is furnished in response to said output selection signal.

23. The information furnishing and collection system according to claim 1, wherein said information furnishing apparatus transfers information from a recording medium in said information furnishing apparatus to said information recording apparatus, said information furnishing apparatus having inlet and outlet portions at opposite ends of a path along which the information travels, said information recording apparatus receives said transferred information from the information furnishing apparatus along the path; and wherein said write management means controls subsequent reproduction of information from said information recording apparatus.

24. The information furnishing and collection system according to claim 1, further comprising an information recording medium in said information furnishing apparatus for recording information representative of inputs by a user of said information furnishing and collection system.

25. An information furnishing and collection system, comprising:

an information furnishing apparatus for providing information to at least one information recording apparatus;

said information furnishing apparatus including a first information recording medium for recording information to be used in said at least one information recording apparatus, a second information recording medium for recording information regarding the use of the information in said first information recording medium by said at least one information recording apparatus, a transmission means for transmitting information recorded on said second information recording medium to the outside, and means for writing information onto said first information recording medium;;

wherein said information furnishing apparatus further comprises a control section for controlling the writing and reading of information into and from said first and second information recording media and the transmission of information by the transmission means;

wherein said at least one information recording apparatus has a control section and recording medium, said control section of the recording apparatus communicating with said control section of said information furnishing apparatus;

wherein said control section in said information furnishing apparatus further comprises means for reading out and transmitting information recorded on said second information recording medium;

wherein said information recording apparatus has an information furnishing condition stored in said recording medium and updates such information in response to the type of information read out from said second information recording medium.

26. An information furnishing and collection system according to claim 25, further comprising a transmission section for transmitting information from outside of said information furnishing apparatus for recording in said first information recording medium.

27. An information furnishing and collection system according to claim 25, further comprising selection means in said information furnishing apparatus providing a selection signal to said control section in said information furnishing apparatus; said selection signal representing the information in said first information recording medium selected for transfer to the recording medium in one of said information recording apparatus by the user, whereby the selected information is utilized and reproduced in the information recording apparatus to allow reproduction of the selected information.

28. An information furnishing and collection system according to claim 27, wherein the selection information inputted by a user of said information furnishing and collection system comprises information regarding a reproduction utilization condition of the information; and said control section in said information furnishing apparatus performs statistical processing on the selection information stored in said second information recording medium and provides an output signal representative of said statistical processing.

29. An information furnishing and collection system according to claim 25, wherein said first information recording medium is an integrated circuit memory.

30. An information furnishing and collection system according to claim 25, wherein said second information recording medium is an integrated circuit memory.

31. An information furnishing and collection system according to claim 25, wherein said at least one information recording apparatus comprises an integrated circuit chip and the recording medium and control section of the information recording apparatus are formed on the integrated circuit chip.

32. An information furnishing and collection system according to claim 25, further comprising a medium for recording information read out from said second information recording medium.

33. An information furnishing and collection system according to claim 25, wherein said means for reading out and transmitting comprises wired or wireless transmission means connected to said control section in said information furnishing apparatus which transmits information processed by said control section based on the information read out from said second information recording medium.

34. An information furnishing and collection system according to claim 25, further comprising a plurality of said information recording apparatuses wherein said information furnishing and collection system collects information from said second information recording medium by said transmission means information from said plurality of information recording apparatuses.

35. The information furnishing and collection system according to claim 25, further comprising a selection means connected to said control section in said at least one information recording apparatus for controlling the reproduction of said information transferred from said information furnishing apparatus to said information recording apparatus.

36. The information furnishing and collection system according to claim 25, wherein each information recording apparatus further comprises a reproduction section for reproducing information in the corresponding recording medium of the information recording apparatus.

37. The information furnishing and collection system according to claim 25, further comprising an information reproduction apparatus including means for receiving at least one information recording apparatus to allow a user to select for reproduction information from said at least one information recording apparatus.

* * * * *